US00RE36561E

United States Patent [19]

Saito et al.

[11] E Patent Number: Re. 36,561

[45] Reissued Date of Patent: Feb. 8, 2000

[54] SHEET FOR HEAT TRANSFERENCE AND METHOD FOR USING THE SAME

[75] Inventors: Masanori Saito; Atsushi Takano, both of Tokyo, Japan

[73] Assignee: Dai Nippon Insatsu Kabushiki Kaisha, Japan

[21] Appl. No.: 08/176,896

[22] Filed: Jan. 3, 1994

Related U.S. Patent Documents

Reissue of:

[64] Patent No.: 4,923,847
Issued: May 8, 1990
Appl. No.: 07/301,989
Filed: Jan. 26, 1989

U.S. Applications:

[62] Division of application No. 07/082,225, Aug. 6, 1987, Pat. No. 4,820,686, which is a division of application No. 06/883,039, Feb. 26, 1986, Pat. No. 4,720,480.

[30] Foreign Application Priority Data

Apr. 15, 1985 [JP] Japan ..... 60-79857

[51] Int. Cl.[7] ..... B41M 5/035; B41M 5/26

[52] U.S. Cl. ..... 503/227; 428/195; 428/913; 428/914

[58] Field of Search ..... 8/471; 428/195, 428/913, 914; 503/227

[56] References Cited

U.S. PATENT DOCUMENTS

| | | | |
|---|---|---|---|
| 4,385,302 | 5/1983 | Moriguchi et al. | 346/76 PH |
| 4,490,434 | 12/1984 | Oshima et al. | 428/341 |
| 4,552,065 | 11/1985 | Billington et al. | 101/93.33 |
| 4,555,427 | 11/1985 | Kawasaki et al. | 503/227 |
| 4,559,273 | 12/1985 | Kutsukake et al. | 503/227 |
| 4,590,490 | 5/1986 | Takanashi et al. | 346/76 PH |
| 4,720,480 | 1/1988 | Ito et al. | 430/945 |
| 4,778,782 | 10/1988 | Ito et al. | 428/211 |

FOREIGN PATENT DOCUMENTS

| | | | |
|---|---|---|---|
| 59-42976 | 3/1984 | Japan | 428/195 |
| 59-55755 | 3/1984 | Japan | 428/195 |
| 60-23064 | 2/1985 | Japan | 428/195 |
| 60-54878 | 3/1985 | Japan | 428/195 |
| 60-145865 | 8/1985 | Japan | 428/195 |
| 60-182139 | 12/1985 | Japan | 428/195 |
| 61-964 | 1/1986 | Japan | 503/227 |
| 2106148A | 4/1983 | United Kingdom | 503/227 |

*Primary Examiner*—B. Hamilton Hess
*Attorney, Agent, or Firm*—Morgan & Finnegan LLP

[57] ABSTRACT

A heat transfer sheet having a heat transfer layer on one surface of a base sheet, said heat transfer layer being formed of a material containing a dye substantially dissolved in a binder with a weight ratio of the dye to the binder (dye/binder ratio) of 0.3 or more, and said base sheet having a heat-resistant slipping layer provided on the surface on which the heat transfer layer is not provided.

A heat transferable sheet to be used in combination with the heat transfer sheet, comprising a receptive sheet having (a) a base sheet and (b) a receptive layer for receiving the dye migrated from the above-mentioned heat transfer sheet on heating, said receptive sheet having an intermediate layer provided between the base sheet and the receptive layer.

12 Claims, 9 Drawing Sheets

(STAGE 1 IS AT A PULSE WIDTH OF 0.3 m Sec, EACH INTERVAL BETWEEN RESPECTIVE STAGES CORRESPONDS TO A PULSE WIDTH OF 0.3 m Sec)

SHEET FOR HEAT TRANSFERENCE AND METHOD FOR USING THE SAME

Matter enclosed in heavy brackets [ ] appears in the original patent but forms no part of this reissue specification; matter printed in italics indicates the additions made by reissue.

This is a *Reissue Application of U.S. Pat. No. 4,923,847 which is a* division of application Ser. No. 082,225 filed Aug. 6, 1987, now U.S. Pat. No. 4,820,686, which in turn is a division of application Ser. No. 833,039 filed Feb. 26, 1986, now U.S. Pat. No. 4,720,480.

BACKGROUND OF THE INVENTION

This invention relates to a sheet material for heat transference, more particularly to a heat transfer sheet for carrying out heat printing in accordance with image information by means of thermal heads or the like and a heat transferable sheet (i.e., a sheet to be transferred) to be used in combination therewith, and also to a heat transfer recording process for forming an image by use of these sheets.

Heretofore, a heat-sensitive color-producing paper has been primarily used to obtain an image in accordance with image information by means of the contact type dot-shaped heating means such as thermal heads or the like. In this heat-sensitive color-producing paper, a leuco dye which is colorless or pale-colored at room temperature and a developer provided on a base paper are contacted by the application of heat to obtain a developed color image. Phenolic compounds, derivatives of zinc salicylate, rosins and the like are generally used as such a developer. However, the heat-sensitive color-producing paper as described above has a serious drawback in that its color disappears when the resulting developed color image is stored for a long period of time. Further, color printing is restricted to two colors, and thus it is impossible to obtain a color image having a continuous gradation.

On the other hand, a heat-sensitive transfer sheet wherein a heat-fusing wax layer having a pigment dispersed therein is provided on a base paper has been recently used. When this heat-sensitive transfer sheet is laminated with a paper to be heat transfer printed, and then heat printing is carried out from the back of the heat-sensitive transfer sheet, the wax layer containing the pigment is transferred onto the heat transferable paper to produce an image. According to this printing process, an image having durability can be obtained, and a multi-color image can be obtained by using a heat-sensitive transfer paper each containing three primary color pigments and printing it many times. However, it is impossible to obtain an image having an essentially continuous gradation as in a photograph.

In recent years, there has been a growing demand for obtaining an image like a color photograph directly from an electrical signal, and a variety of attempts have been made to meet this demand. One of such attempts provides a process wherein an image is projected onto a cathode-ray tube (CRT), and a photograph is taken with a silver salt film. However, when the silver salt film is an instant film, the running cost is disadvantageously high. When the silver salt film is a 35 mm film, the image cannot be instantly obtained because it is necessary to carry out a development treatment after the photographing. An impact ribbon process and an ink jet process have been proposed as further processes. In the former, the quality of the image is inferior. In the latter, it is difficult to simply obtain an image like photograph because an image processing is required.

In order to overcome such drawbacks, there has been proposed a process wherein a heat transfer sheet provided with a layer of sublimable disperse dyes having heat transferability is used in combination with a heat transferable sheet, and wherein the sublimable disperse dye is transferred onto the heat transferable sheet while it is controlled to form an image having a gradation as in a photograph. (Bulletin of Image Electron Society of Japan. Vol. 12. No. 1 (1983)). According to this process, an image having continuous gradation can be obtained from a television signal by a simple treatment. Moreover, the apparatus used in the process is not complicated and therefore is attracting much attention. One example of prior art technology close to this process is a process for dry transfer calico printing polyester fibers. In this dry transfer calico printing process, dyes such as sublimable dispersed dyes are dispersed or dissolved in a solution of synthetic resin to form a coating composition, which is applied onto tissue paper or the like in the form of a pattern and dried to form a heat transfer sheet, which is laminated with polyester fibers constituting sheets to be heat transferred thereby to form a laminated structure, which is then heated to cause the disperse dye to be transferred onto the polyester fibers, whereby an image is obtained. However, even if the heat transfer sheet heretofore used in the dry transfer calico printing process for the polyester fibers is used as it is and subjected to heat printing by means of thermal heads or the like, it is difficult to obtain a developed color image of a high density.

While improvement of the image quality due to printing density and heat sensitivity is an important task in the prior art technology as described above, another important point which is the problem in the practical process of forming a heat transferred image is the operability in the printing step. To describe about this operability, the following problems have been involved in the sheet for heat transference of the prior art.

(a) In the heat transfer sheet of the prior art, when the sheet is conveyed by means of a printing conveying means, the sheet may be sometimes adhered to the roll within the means, whereby running performance of the heat transfer sheet becomes worse.

(b) In the heat transfer sheet of the prior art, the so-called sticking phenomenon occurs, in which the base sheet itself is fused to the thermal heads, whereby running of the heat transfer sheet may become impossible or, in an extreme case, the sheet may be broken from the sticked portion.

(c) In the sheet of the prior art, dust may be inhaled through the electrostatic attracting force created by running or friction of the sheet, whereby disadvantages such as dislocation of recording (partial failure of recording), damages of the dot-shaped heat printing means such as thermal heads or the like, bad running performance such as sagging of respective sheets, etc., caused by attachment of dust between the heat transfer sheet and the heat transferable sheet or between the dot-shaped heat printing means and the heat transfer sheet remain as problems to be solved.

(d) In the heat transferable sheet of the prior art, running performance of the sheet is bad depending on the base sheet employed and, further, the strain created by the heat during image formation disadvantageously remains on the sheet to cause curling of the sheet.

(e) For formation of a color image by heat-sensitive transfer printing, a heat-sensitive transfer sheet in which transfer layers are provided by coating in different areas of a plurality of colors has been invented. However, even such layers may be provided by coating in different areas, there is no guarantee that the area of a desired color can be heat printed and therefore it is necessary to confirm the transfer layer every time of heat printing. Also, in the case of a monochromatic heat-sensitive transfer sheet, it has been inconveniently impossible to confirm the residual amount, the direction, back or front, grade, etc. of the heat-sensitive transfer sheet.

(f) The heat transferable sheet of the prior ant is ordinarily a merely white sheet in appearance and therefore, even a paint prepared from various resins, optionally with addition of additives, may be applied in one layer or multiple layers, it is difficult to discriminate one from another with naked eyes. Not only distinction from papers for other recording systems such as electrostatic copying paper or heat-sensitive recording paper or the like, as a matter of course, but also distinction between several kinds of heat transferable sheets depending on adaptability for recording devices or heat transfer sheets or uses are greatly required.

However, in the prior art, once this kind of heat transferable sheet is unwrapped from a package, distinct tion from appearance is hardly possible and yet no measure for distinction has been taken.

SUMMARY OF THE INVENTION

The present invention has been accomplished in view of the points as described above, and an object of the present invention is to provide a heat transfer sheet and a heat transferable sheet excellent in both of image quality such as printing density, heat sensitivity, etc, and printing operability.

Further, another object of the present invention is to provide a heat transfer recording process by use of the above heat transfer sheet and heat transferable sheet which is guaranteed in ern cient and accurate printing operability.

The heat transfer sheet of the present invention is a heat transfer sheet having a heat transfer layer on one surface of a base sheet, said heat transfer layer comprising a material containing a dye substantially dissolved in a binder with a weight ratio of the dye to the binder (dye/binder ratio) of 0.3 or more, and said base sheet having a heat-resistant slipping layer provided on the surface on which the above heat transfer layer is not provided.

The heat transferable sheet of the present invention is used in combination with the heat transfer sheet and it is a receptive sheet comprising (a) a base sheet and (b) a receptive layer for reeaving the dye migrated from the above-mentioned heat transfer sheet when heated, said receptive sheet having an intermediate layer provided between the base sheet and the receptive layer.

Further, the heat transfer recording process of the present invention is a heat transfer recording process which performns printing by a dot-shaped heating means on a laminate of (a) a heat transfer sheet having a heat transfer layer comprising a substance which can be softened, melted or gasified by heating formed on a base sheet and (b) a heat transferable sheet to be used in combination with the above heat transfer sheet, having a receptive layer for receiving a dye migrated from the above heat transfer sheet on heating formed on a base sheet, to form an inmage on the above heat transferable sheet, which comprises reading the detection mark which is physically detectable formed on the above heat transfer sheet and/or the heat transferable sheet, laminating the above heat transfer sheet with the above heat transferable sheet in accordance with the information read and carrying out printing.

BRIEF DESCRIPTION OF THE DRAWINGS

FIGS. 7 to 9 and 12 to 21 are plan views of the sheets for heat transference of the present invention, respectively;

DETAILED DESCRIPTION OF THE INVENTION

Figure 1:
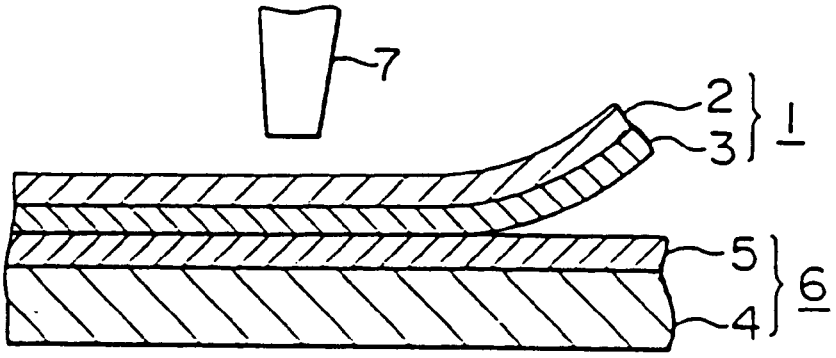
FIGS. 1 to 6, 12 to 15 are sectional views of the sheets for heat transference or the present invention, respectively.

The present invention is described in detail below by referring to the drawings.

As shown in FIG. 1, when carrying out generally heat printing by heat transfer, a heat transfer sheet 1 comprising a heat transfer layer 3 formed on a base sheet 2 is laminated with a heat transferable sheet having a receptive layer 5 formed on a base sheet 4, and the dye in the heat transfer layer is caused to be migrated into the receptive layer by supplying heat energy corresponding to the image information to the interface between the heat transfer layer 3 and the receptive layer 5 thereby to form an image. As the heat source for supplying heat energy, the contact type dot-shaped heating means such as thermal head 7 may be preferably employed. In this case, the supplied heat energy can be continuously or stepwise varied by modulating the voltage or the pulse width applied to the therrnal head.

[A] Heat transfer sheet

Figure 2:
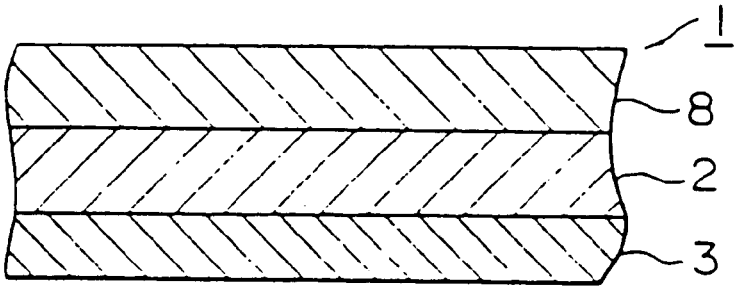

As shown in FIG. 2, the heat transfer sheet 1 of the present invention comprises basically a heat transfer layer 3 made of a specific material on one surface of a base sheet 2 and a heat-resistant slipping layer 8 on the other surface.

Figure 3:
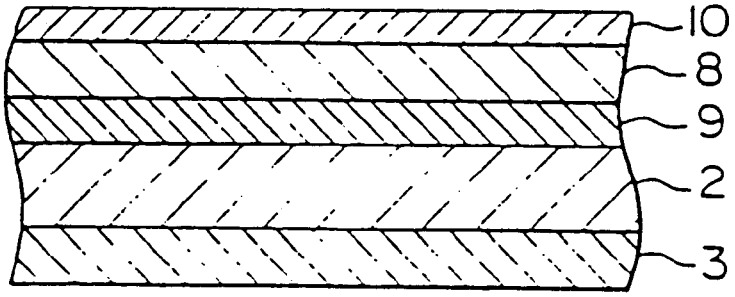

FIG. 3 is a sectional view of the heat transfer sheet according to another embodiment of the present invention, having further a heat-resistant layer 9 between the base sheet 2 and the heat-resistant slipping layer 8, and also an anti-static layer 10 is formed on the surface of the heat-resistant layer 9.

The materials, functions and others of these respective layers are to be described in detail below.

HEAT TRANSFER LAYER

The heat transfer layer 3 comprises a heat sublimable dye and a binder. One specific feature of the heat transfer sheet of the present invention resides in that it comprises a material containing a dye dissolved in a binder with a weight ratio of the dye to the binder (dye/binder ratio) of 0.3 or more. With the above conditions, excellent printing density and heat sensitivity can be obtained to improve image quality. On the other hand, if the dye/binder ratio is greater than 2.3, the storage stability of the sheet will be lowered. Accordingly, the dye/binder ratio may preferably be within the range of from 0.3 to 2.3, more preferably from 0.55 to 1.5.

BASE SHEET

Papers or films such as condenser paper, aramide (aromatic polyamide) film, polyester film, polystyrene film, polysuifone film, polyimide film, polyvinyl alcohol film and cellophane can be used as the base sheet 2. The thickness of the base sheet is from 2 to 50 $\mu$m, preferably from 2 to 15 $\mu$m. Of these papers or films, if cost and heat resistance in an untreated state are regarded as being important, condenser paper is used. If resistance to rupturing (the substrate sheet has mechanical strength and does not rupture during handling in the preparation or a heat transfer printing sheet or during running in a thermal printer) and smooth surface are regarded as being important, an aramide (aromatic polyamide) film, a polyester film is preferably used.

(a) Dye

The dye to be contained in the above heat transfer layer is prelerably a heat sublimable disperse dye, oil-soluble dye, basic dye, and has a molecular weight of the order of about 150 to 800, preferably 350 to 700. The dye can be selected by considering heat sublimation temperature, hue, weatherability, ability to dissolve the dye ink compositions or binder resins, and other factors. Examples of such dyes are as follows:

C.I. (Chemical Index) Yellow 51, 3, 54, 79, 60, 23, 7, 141
C.I. Disperse Blue 24, 56, 14, 301, 334, 165, 19, 72, 87, 287, 154, 26
C.I. Disperse Red 135, 146, 59, 1, 73, 60, 167
C.I. Disperse Violet 4, 13, 36, 56, 31
C.I. Solvent Violet 13, C.I. Solvent Black 3, C.I. solvent Green 3
C.I. Solvent Yellow 56, 14, 16, 29
C.I. Solvent Blue 70, 35, 63, 36, 50, 49, 111, 105, 97, 11
C.I. Solvent Red 135, 81, 18, 25, 19, 23, 24, 143, 146, 182.

(b) Binder

According to the studies by the present inventors, in the heat transfer sheet heretofore generally used, the disperse dye is dispersed in the binder in the form of particles. In order to heat the dye molecules in such a state to sublimate them, the dye molecules must be subjected to heat energy which breaks the interaction in the crystals and overcomes the interaction with the binder, thereby sublimating them to transfer to the heat transferable sheet. Accordingly, high energy is required. When the dye is contained in a high proportion in the binder resin in order to obtain a developed color image having a high density, an image having a relatively high density can be obtained. However, its bond strength in the heat transfer layer of the heat transfer sheet becomes low. Accordingly, when the heat transfer sheet and the heat transferable sheet are peeled off after they are latnated and subjected to printing by thermal heads or the like, the dye tends to transfer to the heat transferable sheet with the resin.

Further, the dye is expensive and the use of excessive dye is economically disadvantageous from the standpoint of office automation (OA) instruments and home uses.

On the other hand, if the dye can be retained in the binder in the form of molecules rather than particles, there will be no interaction in the crystals which occurs in the case where the dye is dispersed in the form of particles, and therefore an improvement in heat sensitivity can be expected. However, even if such a state is accomplished, a transfer paper having practicality cannot be obtained. This is because the molectlar weight of the heat sublimable dye molecules is of the order of 150 to 800 and these molecules are liable to move in the binder. Accordingly, when a binder having a low glass transition temperature (Tg) is used in a heat transfer layer, the dye agglomerates with elapse of time to be deposited. Eventually, the dye may be in the same state as the case where the dye is dispersed in the form of particles as described above. Alternatively, bleeding of the dye may occur at the surface of the heat transfer layer. Accordingly, the dye may be caused to adhere to portions other than the heated portions by the pressure between a thermal head and a platen during recording. Thus, staining may occur to significantly lower the quality of the image.

Further, even if the glass transition temperature (Tg) of the binder in the heat transfer layer is high, the dye molecules cannot be retained in the heat transfer printing layer unless the molecular weight of the binder is considerably high. Furthermore, even if the dye is dissolved in the form of molecules in a binder having a high glass transition temperature and a considerably high molecular weight, affinity between the dye molecules and the binder is required in order to achieve the state of storage stability.

In view of the standpoints as described above, a polyvinyl butyral resin is preferably used as the binder resin. Its molecular weight is 60,000 or more for giving rise to a bond strength as the binder, and not more than 200,000 for making the viscosity during coating adequate. Further, in order to prevent agglomeration or deposition of the dye in the heat transfer layer 3, the glass transition temperature (Tg) of the binder resin must be at least 60° C., more preferably at least 70° C., and no more than 110° C. from the standpoint of facilitating the sublimation of the dye. Further, the content of vinyl alcohol which exhibits good affinity for the dye due to a hydrogen bond and the like is from 10% to 40%, preferably from 15% to 30%, by weight of the polyvinyl butyral resin. If the vinyl alcohol content is less than 10%, the storage stability of the heat transfer layer will be insufficient, and agglomeration or deposition of the dye and the bleeding of the dye onto the surface will occur. If the vinyl alcohol content is more than 40%, the portions exhibiting affinity will be too large, and therefore the dye will not be released from the heat transfer printing layer during printing by means of thermal heads or the like, whereby the printing density becomes low.

In order to improve the drying characteristics in applying/forming the heat transfer layer, cellulose resins can be incorporated into the binder resin in a quantity of up to 10% by weight of the binder resin. Examples of suitable cellulose resins are ethyl cellulose, hydroxyethyl cellulose, ethylhydroxy cellulose, ethylhydroxyethyl cellulose, hydroxypropyl cellulose, and nitrocellulose.

As the binder resin, in addition to the above specific polyvinyl butyral resins, it is also possible to use cellulose resins such as ethyl cellulose, hydroxyethyl cellulose, ethylhydroxyethyl cellulose, hydroxypropyl cellulose, methyl cellulose, cellulose acetate, cellulose acetate butyrate and the like, vinyl resins such as polyvinyl alcohol, conventional polyvinyl butyral, polyvinyl pyrrolidone, polyester, polyvinyl acetate, polyacrylamide and the like.

In order to provide the heat transfer layer 3 on the base sheet 2, the dye and the binder resin may be dissolved in a solvent to form an ink composition for a heat transfer layer. This ink composition may be provided on the base sheet 2 by a suitable printing process or application process. Optional additives may be admixed in the ink composition for the heat transfer layer as needed. A typical example of a preferable additive is a polyethylene wax, and this can improve the properties of the ink composition without any trouble in image formation. Although an extender pigment can also improve the properties of the ink composition, the quality of the printed image is impaired thereby.

HEAT-RESISTANT SLIPPING LAYER

Heat-resistant slipping layer imparts an appropriate lubricating property (slippability) to the sheet surface and also prevents heat fusion between the thermal heads and the heat transfer sheet (sticking phenomenon), thus playing very important roles in improvement of the running performance of the sheet.

The heat-resistant slipping layer 8, in a first embodiment, consists mainly of (a) a reaction product between polyvinyl butyral and an isocyanate, (b) an alkali metal salt or an alkaline earth metal salt of a phosphoric acid ester and (c) a filler. In a second embodiment, the heat-resistant slipping layer 8 consists of a layer containing further (e) a phosphoric acid ester not in the form of a salt in addition to the above components (a), (b) and (c).

Polyvinyl butyral can react with isocyanates to form a resin having good heat resistance. As the polyvinyl butyral, it is preferred to employ one having a molecular weight as high as possible and containing much -OH groups which are the reaction sites with isocyanates. Particularly preferred of polyvinyl butyral are those having molecular weights of 60,000 to 200,000, glass transition temperatures of 60° to 110° C., with the content of vinyl alcohol moiety being 15 to 40% by weight.

Examples or isocyanates to be used in forming the above slipping layer are polyisocyanates such as diisocyanates, triisocyanates or the like, which may be used either singly or as a mixture. Specifically, the following compounds may be employed: p-phenylenediisocyanate, 1-chloro-2,4-phenylenediisocyanate, 2-chloro-1,4-phenylenediisocyanate, 2,4-toluenediisocyanate, 2,6-toluenediisocyanate, hexamethylenediisocyanate, 4,4'-biphenylenediisocyanate, triphenylmethanetriisocyanate, 4,4',4"-trimethyl-3,3',2'-triisocyanate-2,4-triphenylcyanurate; adduct of toluenediisocyanate and trimethylolpropane (e.g. Coronate L produced by Nippon Polyurethane Co.); or the like.

Isocyanates are used generally in an amount generally of 1 to 100%, preferably 5 to 60%, by weight of polyvinyl butyral.

The alkali metal salt or alkaline earth metal salt of a phosphoric acid ester has the function of imparting lubricating property to the heat-resistant slipping layer, and GAFAC RD 720 (Sodium Polyoxyethylene alkyl ether phosphate) produced by Toho Kagaku and others may be employed. The alkali metal salt or alkaline earth metal salt of the phosphoric acid ester is used in an amount of 1 to 50%, preferably 10 to 40%, by weight of polyvinyl butyral. The alkali metal salt or alkaline earth metal salt of a phosphoric acid ester, which is added as the lubricating material in the state dissolved in molecules in the binder, has the advantage of being free from occurrence of roughness at the printed portion, as compared with the case when a solid lubricating material such as mica or talc is added.

Sodium salts of phosphoric acid esters are particularly preferred as the alkali metal salt or alkaline earth metal of phosphoric acid ester, and examples thereof are represented by the formulae shown below:

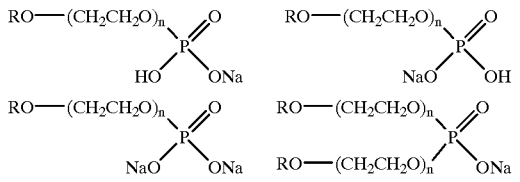

(wherein R is an alkyl or alkylphenyl having 8 to 30 carbon atoms, and n is an average number of moles of ethylene oxide added).

When the alkali metal salt or alkaline earth metal salt of a phosphoric acid ester is compared with its corresponding phosphoric acid ester (not in the form of a salt), it is lower in acidity than the corresponding phosphoric acid ester, as can be seen from the fact that the former exhibits pH 5 to 7 when dissolved in water, while the latter exhibits pH 2.5 or less. Whereas, as described above, polyvinyl butyral reacts with isocyanates to form a base for the heat-resistant slipping layer, and this reaction can proceed with difficulty under strongly acidic region, whereby a long reaction time is required and the crosslinking degree itself is lowered. Accordingly, when a phosphoric acid ester (not in the form of a salt) is added into the reaction system of polyvinyl butyral and isocyanates, long time is needed for the reaction therebetween and yet the crosslinking degree of the product obtained will become necessarily low. In contrast, when an alkali metal salt or alkaline metal salt of a phosphoric acid ester is added to the reaction of polyvinyl butyral with isocyanates, the reaction between both can proceed rapidly and yet a product with great crosslinking degree can be obtained. For this reason, it may be considered that a heat transfer sheet having a heat-resistant slipping layer obtained by addition of an alkali metal salt or alkaline earth metal salt of a phosphoric acid ester to the reaction system of polyvinyl butyral and isocyanates can be wound up and stored without migration of the dye in the heat transfer layer into the heat-resistant slipping layer.

Further, by use of an alkali metal salt or alkaline earth metal salt of a phosphoric acid ester as the agent for imparting lubricating property in the heat-resistant slipping layer, there is an additional advantage that the alkali metal salt or alkaline earth metal salt of the phosphoric acid ester will not be migrated into the heat transfer layer at all, even if the heat transfer layer and the heat-resistant slipping layer may contact closely each other, whereby no staining of the heat transfer layer is recognized.

Examples of filler which can be used are inorganic or organic fillers having heat resistance such as clay, talc, zeolite, aluminosilicate, calcium carbonate, Teflon powder, zinc oxide, titanium oxide, magnesium oxide, silica, carbon, condensates of benzoguanamine and formalin, and others.

The filler should desirably have a mean particle size of 3 $\mu$m or less, preferably from 0.1 to 2 $\mu$. The filler is used in an amount of 0.1 to 25%, preferably 1.0 to 10%, by weight of polyvinyl butyral.

By use of such a filler in the heat-resistant slipping layer, fusion between thermal heads and the heat transfer occurs less frequently, whereby no sticking phenomenon is observed at all.

For provision of the heat-resistant slipping layer 8 on the base sheet 2, the above components may be dissolved in an appropriate solvent to prepare an ink composition for formation of the heat-resistant slipping layer, which is formed on the base sheet 2 according to a suitable printing process or application process, followed by drying simultaneously with causing the reaction to occur between polyvinyl butyral and isocyanates by heating to a temperature from 30° to 80° C., thereby to rorm a heat-resistant slipping layer.

During this operation, it is preferred to prepare a filler-kneaded dispersed composition by previously kneading a filler with the alkali metal salt or alkaline earth metal salt of the phosphoric acid ester.

The heat-resistant slipping layer 8 should preferably have a film thickness of 0.5 to 5 $\mu$m, more preferably 1 to 1 $\mu$m. If the film thickness is thinner than 0.5 $\mu$m, the effect as the heat-resistant slipping layer is not satisfactory, while a thickness over 5 $\mu$m will result in poor heat transmission from the thermal heads to the sublimable transfer layer, whereby the printing density is disadvantageously lowered.

As described above, a heat-resistant slipping layer having satisfactorily excellent performance can be obtained by forming the heat-resistant slipping layer from (a) a reaction product of polyvinyl butyral and isocyanates, (b) an alkali metal salt or alkaline earth metal salt of a phosphoric acid ester and (c) a filler. However, in some cases, when a heat transfer sheet having such a heat-resistant slipping layer is conveyed internally of, for example, a pnnting conveying device, a problem with respect to conveying characteristic of the heat transfer sheet may occur depending on the tension applied on the heat transfer sheet or the printing pressure of the thermal heads.

In such a case, it is preferred to add (e) a phosphoric acid ester not in the form of a salt in addition to the above components (a), (b) and (c) in the heat-resistant slippling layer. The posphoric acid esters not in the form of salts as shown in the alkali metal salts or alkaline earth metal salts of phosphoric acid esters as described above may be used. Specifically, Plysurf 208S (Polyoxyethylene alkyl ether phosphoric acid) produced by Daiichi Kogyo Seiyaku, GAFAC RS710 produced by Toho Kagaku and the like can be used.

Such a phosphoric acid ester not in the form of a salt is used in an amount of 1 to 50%, preferably 1 to 30%, by weight of polyvinyl butyral. At a level in excess of 50% by weight, the dye or the pigment, particularly the dye in the heat transfer layer will undesirably be migrated into the heat resistant slipping layer when stored under piled or wound-up state.

The order in which the heat transfer layer 3 and the heat-resistant slipping layer 8 are provided should preferably be as follows. While it is preferable to apply heating for promoting the reaction between polyvinyl butyral and isocyanates, in order for the heat transfer layer to be unaffected by the heat during this heating, it is preferable to provide first the heat-resistant slipping layer on the base sheet 2 and then the heat transfer layer 3.

By provision of the above heat-resistant slipping layer, the following effects can be obtained.

(a) Even when heated to a considerably high temperature by thermal heads, no sticking phenomonon will occur.
(b) No unclearness occurs at the printed portion.
(c) Even when the heat transfer sheet is stored under wound-up state, the dye in the heat transfer layer will not be migrated into the heat-resistant slipping layer. Thus, storage stability is excellent.
(d) When the heat transfer sheet is conveyed by a printing conveying means, no adhesion of the heat transfer sheet to rolls occurs, whereby conveying performance can be excellent.

HEAT-RESISTANT LAYER

It is preferable to provide a heat-resistant layer 9 separately from the above heat-resistant slipping layer for improvement of heat resistance.

Many kinds of combinations can be used as the synthetic resin curable by heating and its curing agent constituting the heat resistant layer. Typical examples are polyvinyl butyral and polyvalent isocyanate, acrylic polyol and polyvalent isocyanate, cellulose acetate and titanium chelating agent, and polyester and organic titanium compound. Including those, the names of the products readily available in the market and their amounts to be formulated (parts by weight) are shown in the following Table.

| No. | Synthetic resin curable by heating | Amount (parts) | Curing agent | Amount (parts) |
|---|---|---|---|---|
| 1 | Polyvinyl butyral [Ethlec BX-1] (Sekisui Kagaku) | 100 | Diisocyanate [Takenate DIION] (Takeda Yakuhin) | 45 |
| 2 | Urethane polyol [DF30-55] (Dainippon Ink) | 100 | Polyisocyanate [Barnock D-750] (Dainippon Ink) | 20 |
| 3 | Urethane polyol [DF30-55] added with 1% Co | 100 | Polyisocyanate [Barnock D-750] (Dainippon Ink) | 20 |
| 4 | Acrylic polyol [Acryldeck A-801-P] (Dainippon Ink) | 100 | Polyisocyanate [Barnock D-750] (Dainippon Ink) | 20 |
| 5 | Polyester [Byron 200] (Toyobo) | 100 | Polyisocyanate [Barnock D-750] (Dainippon Ink) | 20 |
| 6 | Polyester [Byron 200] (Toyobo) | 100 | Titanium chelate agent [Titabond 50] (Nippon Soda) | 5–10 |
| 7 | Polyester [Byron 200] (Toyobo) | 100 | Organic titanium compound [A-10] (Nippon Soda) | 10 |
| 8 | Polyester [Byron 200] (Toyobo) | 100 | Organic titanium compound [B-10] (Nippon Soda) | 10 |
| 9 | Cellulose acetate [L20] (Hercules) | 100 | Titanium chelate agent [Tiabond 50] (Nippon Soda) | 5 |
| 10 | Cellulose acetate [L20] (Hercules) | 100 | Polyisocyanate [Barnock D-750] (Dainippon Ink) | 10 |
| 11 | Nitrocellulose [Nitcelo SS74] (Dicel) | 20–50 | Polyisocyanate [Barnock D-750] (Dainippon Ink) | 50–20 |
| 12 | Chlorinated rubber [CR10] (Asahi Denka) | 100 | Polyisocyanate [Barnock D-750] (Dainippon Ink) | 30 |
| 13 | Chlorinated rubber [CR10] (Asahi Denka) | 100 | Organic titanium compound [B-10] | 10 |
| 14 | Melamine [Melan 45] (Hitachi Kasei) | 100 | p-toluenesulfonic acid | 20 |

It is sometimes preferable to add an extender pigment to the above synthetic resin. Examples of the extender pigment suited for this purpose are magnesium carbonate, calcium carbonate, silica, clay, talc, titanium oxide and zinc oxide. The amount formulated may generally be suitably 5 to 40% by weight of the resin. Addition and mixing may be conducted desirably so as to effect satisfactory dispersion by means of a three-roll mill or a sand mill.

If adhesive force of the heat-resistant layer to the base film is lacking, corona discharging treatment may be applied or a suitable primer may be used.

Generally speaking, a component for imparting lubricating characteristic (slippability) to the sheet surface and a component for imparting heat resistance tend to cancel each other. For example, in the above heat-resistant slipping layer 8, heat-resistance is lowered by increase or the lubricating component. Accordingly, for obtaining good heat resistance, the thickness of the heat-resistant slipping layer must be made thick. In order to circumvent this problem, it is preferable to provide the above heat-resistant layer 9 laminated with the heat-resistant slipping layer 8. With such a consttution, (1) both of lubricity and heat resistance can be improved at the same time, and (2) the film thickness can consequently be made thinner.

ANTISTATIC LAYER

The antistatic layer 10 has the action of preventing various troubles caused by static electricity, for example, adhesion of dust, generation of wrinkles by attracting force and others.

The antistatic layer 10 makes it easy for charges generated on a heat transfer sheet by charging during handling of the heat transfer sheet to be escaped, and it may be formed by use of a material having semiconductivity.

For example, by use of a metal foil as the base sheet 2, the inconveniences caused by charging can be cancelled. Alternatively, even when the base sheet 2 itself may be a plastic film, a metal foil or a metal vapor deposited film can be laminated therewith to exhibit the same effect.

However, when easiness in handling of the heat transfer sheet, its cost and the usual practice of employing a plastic film such as polyester film as the base sheet 2 are taken into consideration, it is most suitable to form a semiconductive layer by application of a semiconductive coating material containing a semiconductive substance. The place where the semiconductor layer is formed may be at any desired position on the heat transfer sheet as a general rule, but preferably on the outermost surface layer on the front or back of the sheet for the reason of permitting charges accumulated to be readily escaped.

The semiconductive substance to be incorporated into the semiconductive coating material is fine powder of a metal or fine powder of a metal oxide.

Alternatively, organic compounds called "antistatic agents" can be used as the semiconductive substance, and these are excellent with respect to easiness in preparation of a conductive coating material, although they are lower in antistatic ability at low humidity as compared with the above-mentioned metal or metal oxide.

Cationic surfactants (e.g. quaternary ammonium salts, polyamide derivatives), anionic surfactants (e.g. alkylphosphates), amphoteric surfactants (e.g. betaine type) or nonionic surfactants (e.g. fatty acid esters) can be used as "antistatic agent". Further, polysiloxanes can be also used. In connection with the above "antistatic agent", amphoteric or cationic water-soluble acrylic resins can be formed solely without a binder into a coating material, from which a coating with a coated amount on drying of about 0.1 to 2 $g/m^2$ can be formed to provide a conductive layer.

On the other hand, fine powder of titanium oxide or zinc oxide subjected to doping (treatment by baking a mixture of titanium oxide or zinc oxide with an impurity, thereby disturbing the crystal lattices of titanium oxide or zinc oxide) or fine powder of tin oxide may be used as the electron conductive inorganic powder.

The semiconductive coating material containing a semiconductive substance as described above can be prepared according to a conventional process, but preferably, an antistatic agent is used in the form of an alcoholic solution or an aqueous solution. The electron conductive inorganic fine powder is used in the form as such, and is prepared by dispersing it in a solution of a resin for the binder in an organic solvent.

The resin for the binder in the semiconductive coating material is preferably a resin selected from (a) thermosetting resins such as thermosetting polyacrylate resin, polyurethane resin, or (b) thermoplastic resins such as polyvinyl chloride resin, polyvinyl butyral resin, polyester resin, or the like.

The semiconductive coating material prepared is coated by conventional coating methods by, for example, blade coater, gravure coater or alternatively by spray coating.

The antistatic layer has a thickness of 1 to 3 $\mu$m, or 1 to 5 $\mu$m in some cases, and the ratio of the binder to the conductive substance is determined so that the surface resistivity of the antistatic layer after coating and drying (sometimes after curing) may become $1\times10^{10}$ ohm·cm. The amphoteric or cationic water-soluble acrylic resin may also be formulated into a coating material of an alcoholic solution with addition of 5 to 30% by weight of the binder as the conductive substance.

DETECTION MARK

Detection mark gives an information for confirming the region of a desired color in a heat transfer sheet having a plurality of colors applied separately or confirming the residual amount of sheets in a monochromatic heat transfer sheet, or otherwise confirming front or back, direction, grade, etc. of the sheet.

Figure 4:
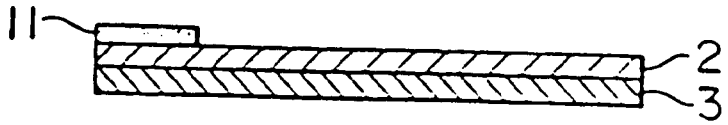
Figure 5:
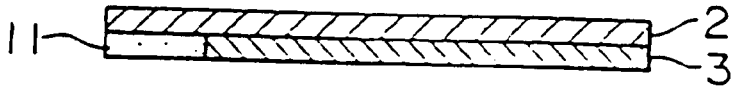
Figure 6:
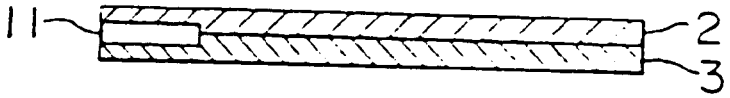

FIG. 4 to FIG. 6 are sectional views of the positions where the detection marks are formed.

The heat transfer sheet in FIG. 4 has a heat transfer layer 3 on one surface of the base sheet 2 and also a detection mark 11 on the other surface. FIG. 5 shows another embodiment, in which a detection mark 11 is provided on the same side of the heat transfer layer 3, as contrary to the case of FIG. 4. FIG. 6 shows still another embodiment, showing the state where a detection mark 11 is provided between the base sheet and the transfer layer 3. The above three examples are not limitative, but the detection mark 11 may be provided at any desired position.

Figure 7:
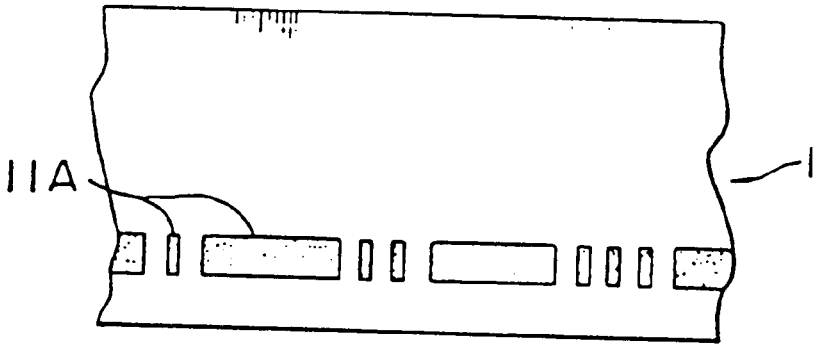
Figure 8:
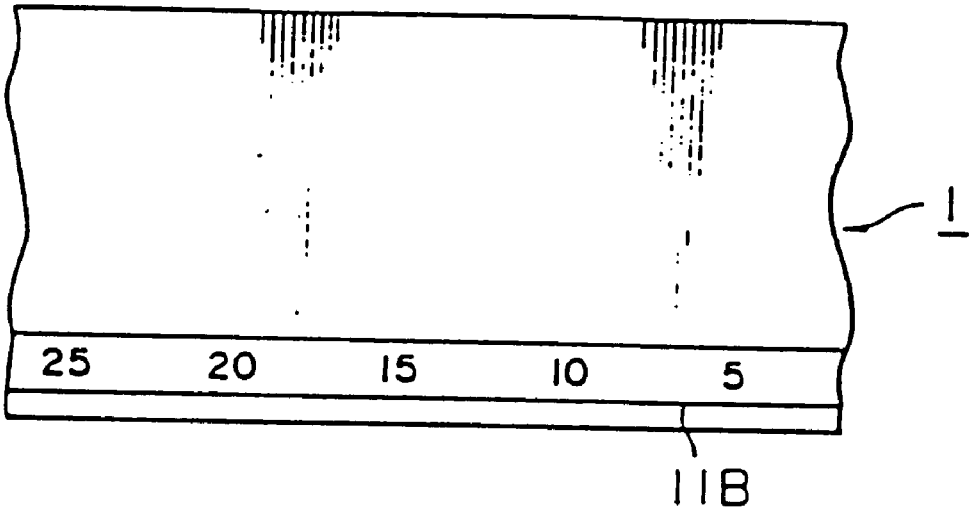
Figure 9:
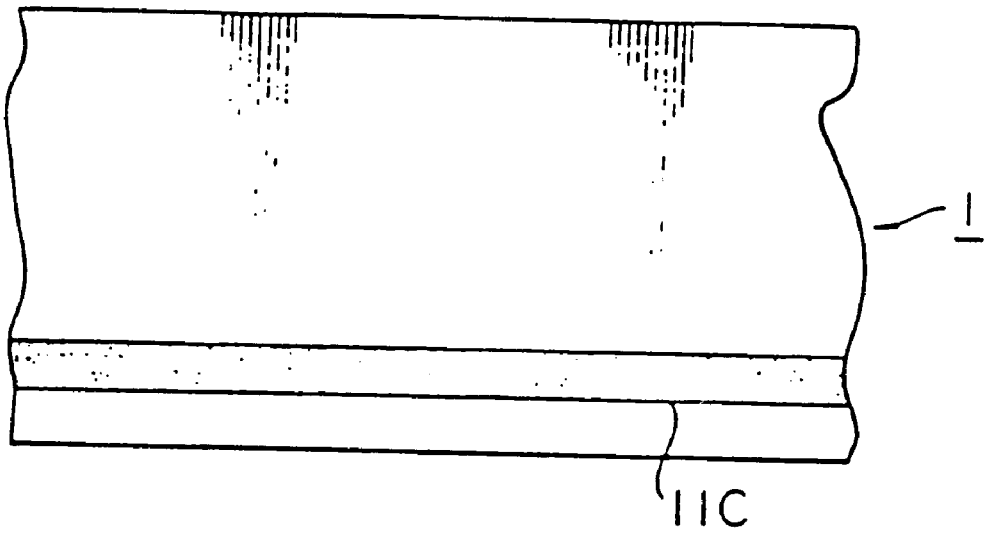

FIG. 7 to FIG. 9 are each plan view showing the shape when a detection mark is to be provided on the heat transfer sheet of the present invention. The heat transfer sheet 1 in FIG. 7 has a detection mark with a shape of bar code pattern 11A. FIG. 8 shows a detection mark 11B formed as an English letter or figure readable by a man, which is convenient for confirmation of the residual amount. Particularly, if it is formed as OCR letter instead of a mere letter, optical reading is also possible. FIG. 9 shows a detection mark 11C which is formed as a magnetic layer. Otherwise, the detection mark may be also provided by an electroconductive layer.

In FIG. 7 to FIG. 9, it is not expressed at which position of the heat transfer sheet the detection mark is to be provided, but every one of the heat transfer sheets of FIG. 7 to FIG. 9 can take any of the sectional structures as shown in FIG. 4 to FIG. 6.

Since the heat transfer sheet is generally supplied in the form of a wound-up roll to a recording device provided with recording means such as thermal heads, the detection mark should preferably be provided continuously in parallel to the delivering direction (length direction) of the heat transfer sheet as shown in FIG. 7 to FIG. 9. Here, when the detection mark is provided as the so-called end mark, which shows or gives a prealarm of the end of the heat transfer sheet, it may sufficiently be provided only in the vicinity of the end of the transfer sheet, merely as a one point mark. More preferably, it may be provided over a certain length from the end. Further, the detection mark can be provided over the entire length of the heat transfer sheet, with input of the information about the length of the detection mark, whereby the residual amount of the heat transfer sheet can constantly be confirmed during usage. Also, when the detection mark shows the positions ofdifferent areas separately applied of the heat transfer sheet having such areas, and separate applications are done in the length direction, it is preferred that the detection mark should be provided over the entire length of the heat transfer sheet, with input of an information indicating the position where the region for red color ends to be changed to the region for black color as the boundary between different regions and/or the region for black color. Such separate applications may be done in any desired manner by use of, for example, two colors of black and white, or four colors of yellow, red, blue and black. The detection mark for the separately applied heat transfer sheet can also be endowed with the function of an end mark, as a matter of course. Input of an information into the detection mark can be effected as desired depending on the shape of the detection mark.

By providing a detection mark as described above, the detection mark can be read by means of a conventional bar code reading device such as of the transmission type or the reflection type, or as the on-off signal by making the optical densities only two values, when the detection mark is a pattern which can be optically read, or alternatively the detection mark can be read by means of a magnetic head, when it is formed as a magnetic layer. When it is formed as the electroconductive layer, it can be read by use of electrodes.

The detection marks shown in FIG. 7 and FIG. 8 use a pigment or a dye as the colorant and comprise a composition having these colorants dispersed in a resin. A typical example of the colorant is carbon black. On the other hand, examples of the resin constituting the composition may include the following:

respective resins of ethyl cellulose, nitrocellulose, polyamide, chlorinated rubber, polystyrene, shellac, polyvinyl alcohol, acryl, polyester and the like. The detection mark may be also formed by utilizing a coating material for formation of the heat transfer layer.

The detection mark shown in FIG. 9 is formed of a ferromagnetic material such as $\gamma$-$Fe_2O_3$, $Fe_3O_4$. Co-containing $\gamma$-$Fe_2O_3$. Co-containing $Fe_3O_4$ or $CrO_2$ dispersed in as resin binder such as vinyl chloride-vinyl acetatevinyl alcohol copolymer, acrylic resin or styrenebutadicne copolymer. In this case, recording is performed by applying orientation treatment on the magnetic layer and inputting magnetically desired informations. The characteristic of a magnetic layer capable of writing, rewriting and erasing is useful.

OTHERS

The heat transfer sheet according to the present invention has basically the constitution as described above, and it is also possible to apply additional treatments as described below thereon. First, in FIG. 2, between the transfer layer 3 and the base sheet 2 or between the heat-resistant slipping layer 8 and the base sheet 2, a primer layer may be provided for improvement of adhesive force between the respective layers. Known materials may be available for the primer layer. For example, by use of a primer layer of an acrylic resin, a polyester resin, a polyol and a diisocyanate, or the like, adhesion between both layers can be improved particularly when employing a polyester or an aramide (aromatic polyamide) as the base sheet 2. Corona discharging treatment may also be applied for the same purpose.

FORM OF HEAT TRANSFER SHEET, ETC.

The heat transfer sheet may be in the form of sheets separately cut to desired dimensions, or alternatively in the continuous or wound-up sheet, or further in the form of a narrow tape.

Figure 10:
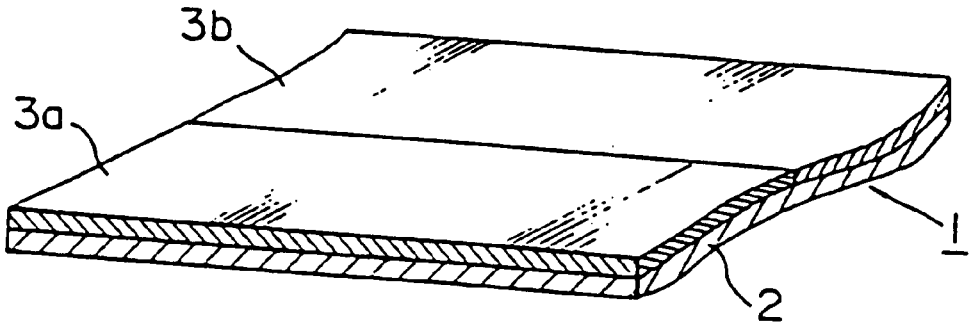
FIGS. 10 and 11 are perspective views of the sheets for heat transference of the present invention, respectively.
Figure 11:
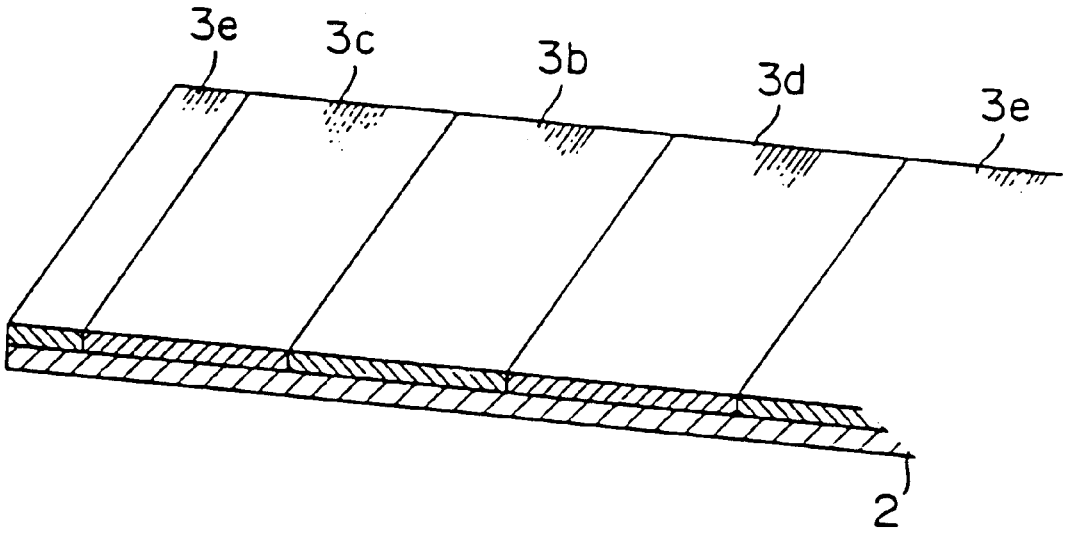

In providing the heat transfer layer 3 on the base sheet 2, a coating composition for heat transfer layer containing the same colorant may be applied over the entire surface of the base sheet, or in some cases, a plurality of ink compositions for heat transfer layer containing different colorants, respectively, may be formed at different areas on the surface of the substrate sheet, respectively. For example, it is possible to use a heat transfer sheet as shown in FIG. 10, in which a black heat transfer layer 3a and a red heat transfer layer 3b are laminated in parallel on the base sheet 2, or a heat transfer sheet as shown in FIG. 11, in which a yellow heat transfer layer 3c, a red heat transfer layer 3b, a blue heat transfer layer 3d and a black heat transfer layer 3e are provided repeatedly on the base sheet 2. By use of a heat transfer sheet having such plural heat transfer layers with different hues, there ensues the advantage of obtaining a multicolor image with one heat transfer sheet.

[B] Heat transferable sheet

Figure 12:
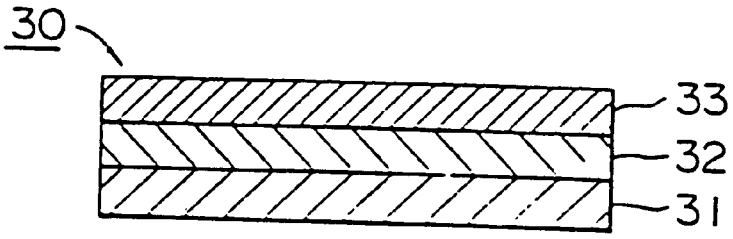

As shown in FIG. 12, the heat transferable sheet 30 comprises basically an intermediate layer 32 and a receptive layer 33 laminated in this order on the base sheet 31.

Figure 13:
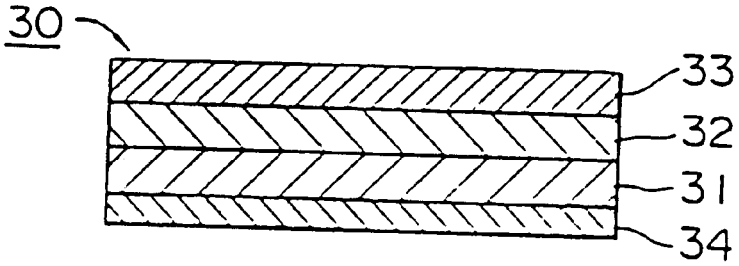
Figure 14:
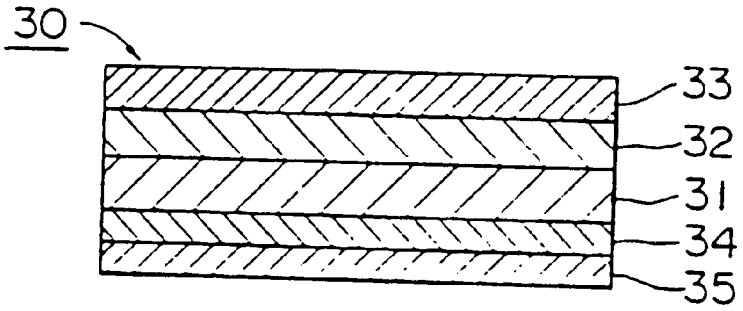

FIG. 13 and FIG. 14 show examples of the heat transferable sheets according to other embodiments of the present invention and, as shown in the drawings, a lubricating layer 34 is provided on the surface of the base sheet 31. Further, in the case of FIG. 14, an antistatic layer is provided on the surface of the lubricating layer 34.

In the following, the materials, functions and others of these respective layers are described in detail.

BASE SHEET

The base sheet 31 has the role of holding the intermediate layer 32 and the receptive layer 33, and it is also required to have a mechanical strength to the extent that handling may be possible without any trouble even under heated state, since heat is applied during heat transfer.

Typical examples of such a base sheet 31 may include printing paper, coated paper, cast coated paper or synthetic paper, or flexible thin layer sheet such as plastic film. Among them, synthetic paper, coated paper and polyethylene terephthalate film are frequently used. In particular, synthetic papers are most preferable because synthetic papers have a microvoid layer having a law thermal conductivity on the surface thereof The base sheet 31 may have a thickness generally of about 50 to 300 $\mu$m, preferably about 5 to 15 $\mu$m.

INTERMEDIATE LAYER

The intermediate layer 32 is very important for improvement of the image quality.

Generally speaking, the receptive layer which is the resin layer capable of dying with a dye on the heat transferable transfer sheet is required to have the following properties:

(a) it should receive satisfactorily the dye migrated by heating for a short time such as by printing with thermal heads to effect color formation;

(b) it should be free from blocking even under the state wound up or laminated before use;

(c) after use (after recording), the dye once received must not be resublimated even when superposed on other films or papers; and (d) printed shapes following the printing units such as the shapes of thermal heads should be obtained, and also the same density should be obtained under the same printing conditions.

Of the above requisites (a) to (d), (a) to (c) ase problems to be solved by the resin constituting the receptive layer, the additive to be incorporated in the receptive layer or the surface treatment of the receptive layer. However, with respect to the point (d), the problem remains which cannot be solved only by improvement of the receptive layer.

For, in order to ensure reproducibility in shape or density during printing, the receptive layer may be constituted of a soft resin and fitness between the heat transfer layer of the heat transfer sheet and the receptive layer of the heat transferable sheet may be made complete during printing thereby to prevent generation of air gap. However, such a resin is prone to blocking due to lower softening point, and the dye once received may be subject to resublimation or blurring.

Alternatively, smoothness of the surface of the receptive layer may be improved to give a surface roughness of 2 to 3 $\mu$m or less, whereby fitness to the heat transfer sheet can be improved. However, a receptive layer with such a smoothness can be obtained with difficulty by mere coating, and such a means as (a) film formation by extrusion, followed by lamination with paper, etc. or (b) coating of a coating material, followed by drying and smoothening with calender rolls is required to be used.

The heat transferable sheet of the present invention has one specific feature in that the above point (d) which has not hitherto been solved is solved, and the above problem has been solved by providing an intermediate layer, which could function as so to speak a cushioning layer, between the base sheet and the receptive layer.

The intermediate layer 32 as the characteristic portion of the present invention, consists mainly of a resin having a 100% niodulus of 100 kg/cm$^2$ or lower as defined under JIS-K-6301. Here, if the 100% modules exceeds 100 kg/cm$^2$, rigidity is too high. When an intermediate layer is formed with the use of such a resin, no satisfactory adhesion can be maintained between the heat transfer sheet and the heat transferable layer. As to the lower limit of the 100% modulus, it is about 0.5 kg/cm$^2$.

The resins meeting the above conditions may include the following:

polyurethane resins;
polybutadiene resins;
polyacrylate resins;
polyester resins;
epoxy resins;
polyamide resins;
rosin-modified phenol resins;
terpene phenol resins; and
ethylene/vinyl acetate copolymer resins.

The above resins can be used either singly or a mixture of two or more resins. Since the above resins have relatively tackiness, if there is any trouble during working, it is possible to add an inorganic additive such as silica, alumina, clay, calcium carbonate, etc. or an amide type substance such as stearic acid amide or the like.

The intermediate 32 can be formed by kneading the resin as described above, optionally together with other additives, with a solvent or diluent to provide a paint or an ink, which may be in turn formed into a coating according to the known coating method or printing method, followed by drying. Its thickness may be about 0.5 to 50 $\mu$m, preferably about 2 to 20 $\mu$m. If the thickness is less than 0.5 $\mu$m, the roughness of the surface of the base sheet provided cannot be absorbed, thus giving no effect. On the contrary, if it exceeds 50 $\mu$m, not only improvement of the effect can be seen, but also the heat transferable sheet becomes too thick, thus becoming bulky when wound up or piled, and it is also not economical.

In the present invention, improvement of fitness between the heat transfer sheet and the heat transferable sheet by formation of the intermediate layer 32 may be considered to be due to low rigidity of the intermediate layer 32 itself, which can be deformed by the pressure during printing. Further, the resin as described above is generally lower in glass transition point or softening point, and therefore readily deformable than at normal temperature when applied with heat energy during printing to be further lowered in rigidity. This may be also considered to be another contribution to improvement of the fitness.

RECEPTIVE LAYER

The material for constituting the receptive layer may include the resins as set forth below:

(a) those having ester bonds:
polyester resin, polyacrylate resin, polycarbonate resin, polyvinyl acetate resin, styrene-acrylate resin, vinyltolueneacrylate resin and the like;
(b) those having urethane bonds;
polyurethane resin and the like;
(c) those having amide bonde:
polyamide resins (nylon);
(d) those having urea bonds:
urea resins and the like; and
(e) others having bonds of high polarity:
polycaprolactone resin, styrene/maleic acid resin, polyvinyl chloride resin, polyacrylonitrile resin and the like.

In addition to the above synthetic resins, mixtures of these and copolymers may be also available.

Preferable materials may be classified broadly into the two embodiments as shown below:

(a) The first embodiment consists of mixed resins of saturated polyesters and vinyl chloride-vinyl acetate copolymers. Saturated polyesters may be, for example, Byron 200, Byron 290, Byron 600 or the like (produced by Toyobo), KA 1038C (produced by Arakawa Kagaku). TP220, TP235 (produced by Nippon Gosei) and others. The vinyl chloridc-vinyl acetate copolymers may contain 85 to 97 wt. % of vinyl chloride, having preferably a polymerization degree of about 200 to 800. The vinyl chlonde-vinyl acetate copolymers are not necessarily limited to the copolymers consisting only of vinyl chloride component and vinyl acetate coponent, but may also contain vinyl alcohol component, maleic acid component, provided that the objects of the present invention are not hampered thereby. Such vinyl chloridevinyl acetate copolymers may include, for example, Ethlec A, Ethiec C, Ethlec M (produced by Seksui Kagaku Kogyo), Vinylite VAGH, Vinylite VYHO, Vinylite VMCH, Vinylite VYLF, Vinylite VYNS, Vinylite VMCC, Vinvlite VMCA, Vinylite VAGD, Vinylite VERR, Vinylite VROH (produced by Union Carbide Co.), Denkavinyl 1000GKT, Denkavinyl 1000L, Denkavinyl 1000CK, Denkavinyl 1000A, Denkavinyl 1000LK$_2$, Denkavinyl 1000AS, Denkavinyl 1000MT$_2$, Denkavinyl 1000CSK, Denkavinyl 1000CS, Denkavinyl 100GK, Denkavinyl 100GSK, Denkaviayl 1000GS, Denkavinyl 1000LT$_3$, Denkavinyl 1000D, Denkavinyl 1000W (produced by Denkikagaku Kogyo). The mixing ratio of the above polyester and the vinyl chloride-vinyl acetate copolymer may preferably be 900 to 100 parts by weight of the saturated polyester per 100 parts by weight of the vinyl chloride-vinyl acetate copolymer.

(b) The second embodiment consists of polystyrenes and copolymers of styrene with other monomers. Specific examples may include polystyrene type resins comprising homopolymers or copolymers of styrene type monomers such as styrene, $\alpha$-methylstyrene, vinyltoluene or the like, or styrene type copolymer resins which are copolymers of the above styrene type monomers with other monomers, including acrylic or methacrylic monomers such as acrylate, methacrylate, acrylonitrile. methacrylonitrile or maleic acid. The polystyrene type resins may be, for example, one or mixtures of two or more polymers selected from the group of styrene type homopolymers, copolymers of α-methylstyrene with vinyl toluene, copolymers of α-methylstyrene with styrene, and the seven kinds as shown below may be possible.

(i) styrene type homopolymer (A) alone;

(ii) copolymer of a-methylstyrene and vinyltoluene (B) alone;

(iii) copolymer of a-methylstyrene and styrene (C) alone;

(iv) mixture of (A) and (B);

(v) mixture of (A) and (C);

(vi) mixture of (B) and (C); and (vii) mixture of (A), (B) and (C).

In the above mixtures, the mixing ratios in the respective cases may be as follows;

(iv) 100 parts by weight of (A)/10 to 90 parts by weight of (B);

(v) 100 parts by weight of (A)/10 to 90 parts by weight of (C);

(vi) 100 parts by weight of (B)/10 to 90 parts by weight of (C); and (vii) 100 parts by weight of (A)/10 to 90 parts by weight of (B)/10 to 90 parts by weight of (C).

Also, in the present invention, the above resins (i) to (vii) can be mixed with a vinyl chloride-vinyl acetate copolymer. By mixing with such a resin, the advantages can be obtained with respect to coating characteristic, improvement in physical properties of the film (improvement of flexibility), etc. The above resin may include Vinylite VYHH, VMCC (produced by UCC Co.) and the like, and its mixing amount may preferably be about 20 to 90 parts by weight per 100 parts by weight of the resin shown by the above (i) to (vii).

Specific examples of styrene type copolymer resins may include Himer SBM-100, SBM-73F, SAM-955 (styrene/acrylate copolymers produced by Mitsubishi Kasei Kogyo K.K.), KA1-39-S (styrene/acrylate copolymer produced by Arakawa Kagaku Kogyo K.K.), RMD-4511 (styrene/acrylonitrile copolymer produced by Union Carbide Co.), TYRIL-767 (styrene/acrylonitrine copolymer produced by Dow Chemical Co.), CYMAC100 (styrene/acrylonitrile produced by A.C.C.), Oxylac SH-101 (styrene/maleic acid copolymer produced by Nippon Shokubai Kagaku Kogyo K.K.) and the like.

Also, in the present invention, the above resins (i) to (vii) can be mixed with a polyester resin. By mixing with such a resin, it is possible to obtain such advantages as improvement of dyeability of the dye, improvement of coating characteristic, etc. The polyester resin may include Byron 200 (produced by Toyobo), TP 220, TP 235 (produced by Nippon Gosei) and the like, and its mixing amount may preferably be about 20 to 80 parts by weight per 100 parts by weight of the resin shown by the above (i) to (vii).

In both of the above first and second embodiments, for the purpose of further enhancing sharpness of the transferred image by improvement of whiteness of the receptive layer simultaneously with imparting writability onto the heat transferable sheet surface and also preventing retransfer of the transferred image, a white pigment can be added in the receptive layer. Titanium oxide, zinc oxide, kaolin, clay, calcium carbonate, fine powdery silica and others may be used as the white pigment, and these can be used as a mixture of two or more kinds. Anatase form titanium oxide and rutile form titanium oxide may be available as titanium oxide. Also, for further enhancement of the light resistance of the transferred image, a UV-ray absorber and/or a light stabilizer may be added in the receptive layer. These UV-ray absorbers and light stabilizers may be added in amounts of 0.5 to 10 parts by weight and 0.5 to 3 parts by weight, respectively, per 100 parts by weight of the resin constituting the receptive layer 3.

For improvement of mold releasability of the heat transferable sheet and the heat transfer sheet of the present invention, the receptive layer can contain a mold release agent. The mold release agent may preferably be solid waxes such as polyethylene wax, amide eax, Teflon powder and others; fluorine type, phosphate type surfactant; silicone oil; and others. Among them, silicone oil is preferred.

Figure 15:
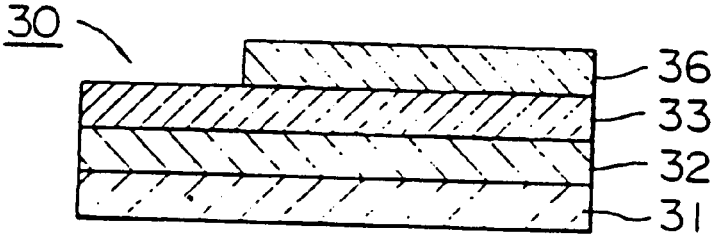

The above silicone oil may be oily, but a cured type is preferred. The cured type silicone oil may include the reaction cured type, photocured type and the catalyst cured type, of which the reaction cured type is preferred. The cured product by reaction between an amino-modified silicone oil and an epoxy-modified silicone oil is preferred as the reaction cured type silicon oil. Examples of the amino-modified silicone oil are KF-393, KF-857, KF-858, X-22-3680, X-22-3801 (produced by Shin-etsu Kagaku Kogyo K.K.), and examples of the epoxy-modified silicone oil are KF-100T, KF-101, KF-60-164, KF-103 (produced by Shin-etsu Kagaku Kogyo K.K.). On the other hand, examples of the catalyst cured type or the photocured type silicone oil are KS-705F, KS-770 (catalyst cured type silicone oils produced by Shin-etsu Kagaku Kogyo K.K.), KS-720, KS-774 (photocured type by silicone oils produced by Shin-etsu Kagaku Kogyo K.K.). These cured type silicone oils may be added in amounts preferably of 0.5 to 30 wt. % of the resin constituting the receptive layer. Also, as shown in FIG. 15, a mold release agent layer can be provided on a part of the surface of the receptive layer 33 by applying a solution or dispersion of the above mold release agent in an appropriate solvent and then drying the coating. The mold release agent constituting the mold release layer 36 is particularly preferably the cured product from the reaction of the amino-modified silicone oil and the epoxy-modified silicone oil as described above. When a silicone oil is added during formation of the receptive layer 33, the silicone oil will bleed out on the surface, and therefore the mold release agent layer 36 can be formed by curing after the silicone oil has bled out. The mold release agent layer may have a thickness preferably of 0.01 to 5 μm, particularly 0.05 to 2 μm. The mold release agent layer 36 may be provided either on a part of the surface or the entire surface of the receptive layer 33. When it is provided on a part of the surface of the receptive layer 33, dot impact recording, heat-sensitive fuse transfer recording or recording with a pencil, etc. can be performed on the ponions where no mold release agent layer 36 is provided, while sublimation transfer recording can be performed on the portion where the mold release agent layer 36 is provided. Thus, the sublimation transfer recording system can be performed in combination with other recording systems. It is also possible to form a writable layer by providing a resin layer containing a white pigment which can be added into the receptive layer juxtaposed to or on the receptive layer.

LUBRICATING LAYER

The lubricating layer 34 is provided for taking out heat transferable sheets one by one easily, and may be made of various materials. A typical lubricating layer 34 is one which is readily slippable between the surface of its lubricating layer and the adjacent receptive layer surface of the transferable sheet, in other words, having little static frictional coefficient.

Such a lubricating layer 34 is a coating film of a synthetic resin as exemplified by methacrylate resins such a methyl methacrylate resin or corresponding acrylate resin, or a vinyl type resin such as vinyl chloride/vinyl acetate copolymer.

It is entirely unexpected that these coating films have the effect in taking out the heat transferable sheet one by one, and no expected effect can be obtained by merely providing an antistatic layer on the back of the base sheet 31.

The lubricating layer 34 can be formed by kneading a synthetic resin for constituting layer with other components optionally added to form a coating composition, which is then applied according to the same coating method as used for the receptive layer, followed by drying. Its thickness is 1 to 10 $\mu$m.

When a synthetic paper is used as the base sheet 31, by providing the above lubricating layer 34, there is the effect of preventing generation of curl which will readily occur during formation of image.

ANTISTATIC LAYER

The antistatic layer 35 has the function of permitting charges generated on the heat transferable sheet by charging during handling thereof to be readily escaped, and may be formed of any material having electroconductivity at any desired portion, but preferably on the outermost layer on the front or back for permitting the accumulated charges to be escaped.

The same materials and the method for formation of an antistatic layer as used in the heat transfer sheet can be utilized.

Since a paper is used as the base sheet 31 as described above, an aqueous solution of an antistatic agent can be applied or a dispersion or a solution of the electron conductive inorganic fine particles as mentioned above in an aqueous coating material such as a synthetic resin emulsion, a synthetic rubber latex or an aqueous solution of a water-soluble resin can be applied in this case to form a dry coating of about 3 to 10 g/m$^2$.

The synthetic resin emulsion may be exemplified by emulsions of polyacrylate resins or polyurethane resins; the synthetic rubber latex by rubber latices of methyl methacrylate-butadiene, styrene-butadiene or the like; and the aqueous solution of water-soluble resin by aqueous solutions of polyvinyl alcohol resin, polyacrylamide resin, starch and the like.

Alternatively, more simply, an aqueous solution of an antistatic agent may be applied by spray coating.

This method is not only simple, but also can very effectively prevent the heat transferable sheet from curl.

DETECTION MARK

In the heat transferable sheet of the present invention, a detection mark can be provided at a desired position of the sheet in order to detect and confirm the direction, front or back, kind or grade of the sheet, the recording initiating position and others.

FIG. 16 to FIG. 21 show some embodiments of the detection mark.

Figure 16:
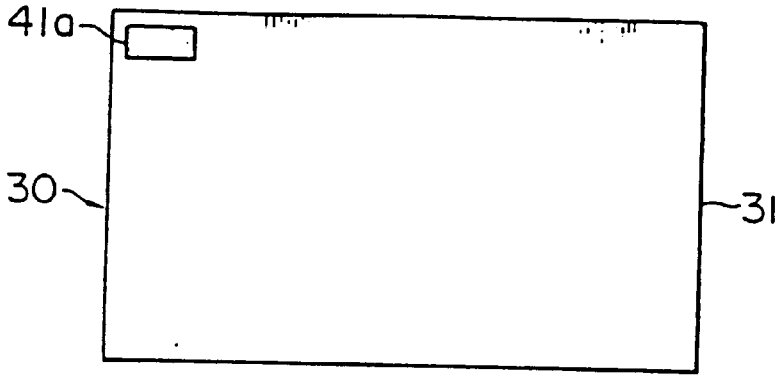

The heat transferable sheet 30 in FIG. 16 has a magnetic layer 41a at the corner on the surface of the base sheet 31 on the side where no receptive layer is provided, namely the back.

Figure 17:
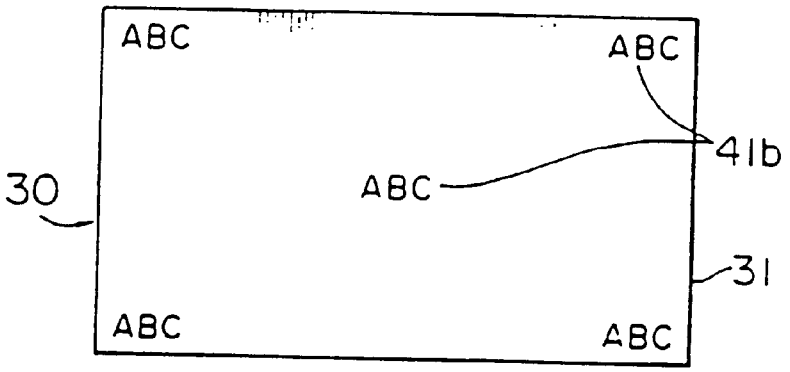

The heat transferable sheet 30 in FIG. 17 has a letter 41b on the back of the base sheet 31.

Figure 18:
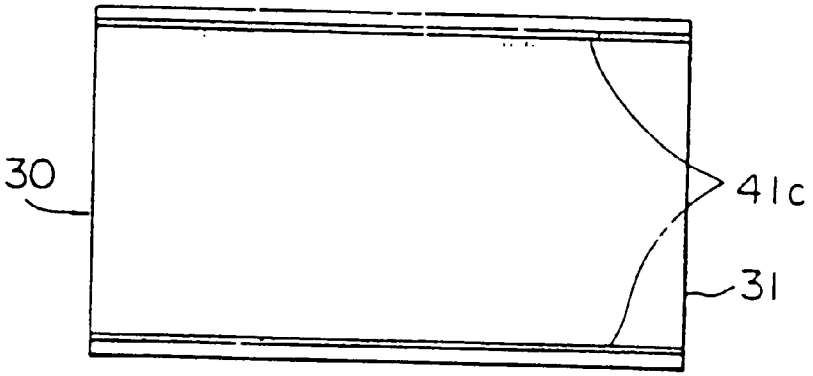

The heat transferable sheet 30 in FIG. 18 has electroconductive layers 41c in shape of stripes at both opposed brims on the back of the base sheet 31.

Figure 19:
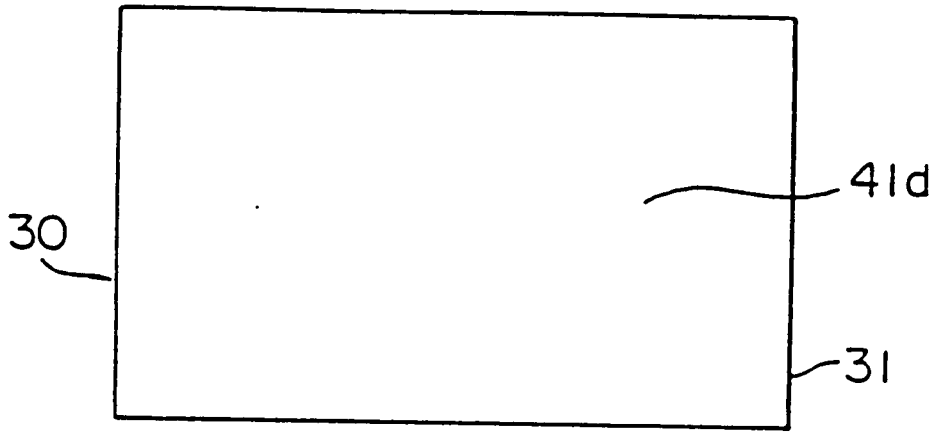
Figure 20:
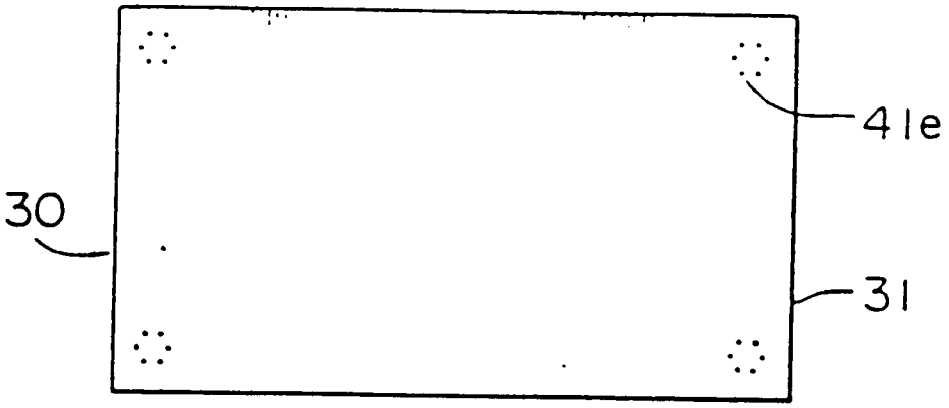

The heat transferable sheet 30 in FIG. 19 has a fluorescent ink layer 41d over the entire surface of the back of the base sheet 31.

As can be also understood from the above examples, the physically detectable mark possesed by the heat transferable sheet 30 can comprise various materials in various forms.

For example, an electrically detectable mark can be formed of an electroconductive layer by use of a electroconductive ink, a metal foil and others, while a magnetic layer formed of a magnetic ink containing a magnetic material or a vapor deposited film of a magnetic metal is a magnetically detectable mark and a layer formed of an ink containing a dye, a pigment or a fluorescent dye is an optically detectable mark.

Other than those as mentioned above, those having mechanically detectable marks can be also used similarly as those having other marks.

Otherwise, marks may be provided with a transparent electroconductive ink containing a transparent electroconductive substance, or marks changed partially in reflectance of light may be provided by application of unevenness on a part of the base sheet.

The detection mark as described above may be in the form of line, stripe, matrix, letter or pattern, or a combination of the above-mentioned shapes. The pattern may be spherical, ellipsoidal, triangular, square or a trade mark (including letters).

These marks may be provided at various positions, but it is preferred to provide on the side where no receptive layer, on which an image is to be formed, is provided, namely the back side of the base sheet. However, even on the front side, it can be provided on the brim or the corner of the receptive layer, or on the blank space of the base sheet formed by providing the receptive layer with residual marginals.

The position at which the mark is provided may be the position where image is to be formed, provided that it does not cause any trouble in image formation.

Further, marks can be arranged in various manners. Lines or stripes would generally be provided at the brim or near the brim of the heat transferable sheet in parallel to the brim. However, they can be provided also in the center of the heat transferable sheet or also obliquely relative to the brim in place of being parallel thereto. Further, in the case of shapes other than lines or stripes, they are generally provided at the corners, but they can be provided over one surface or at the center. The number of the mark is not limited to one but a plurality of marks may also be provided, or two or more marks with different patterns may also be provided. Further, a plurality of marks detectable according to various systems may be co-present. For example, a magnetic layer and an electroconductive layer may be co-present.

Figure 21:
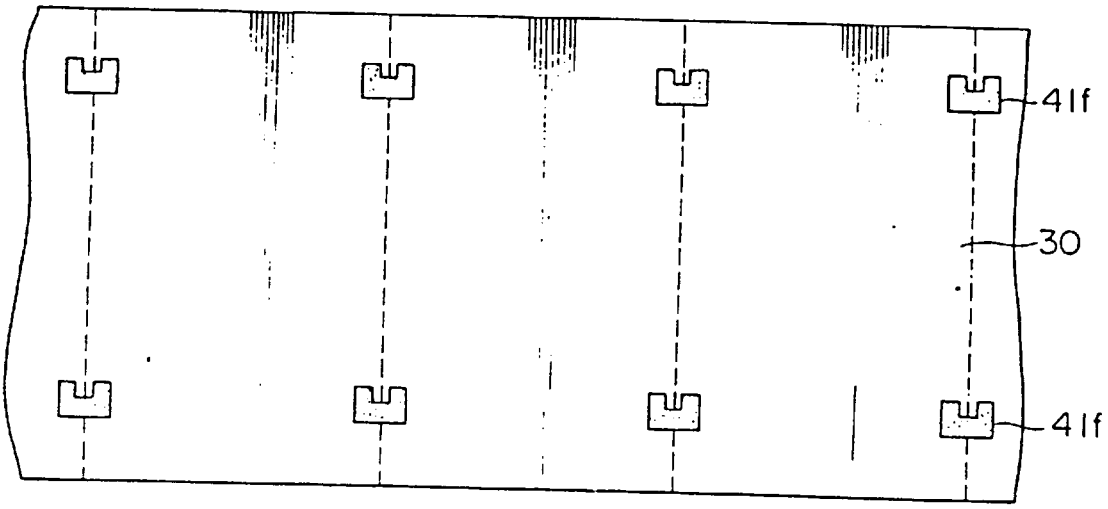
Figure 22:
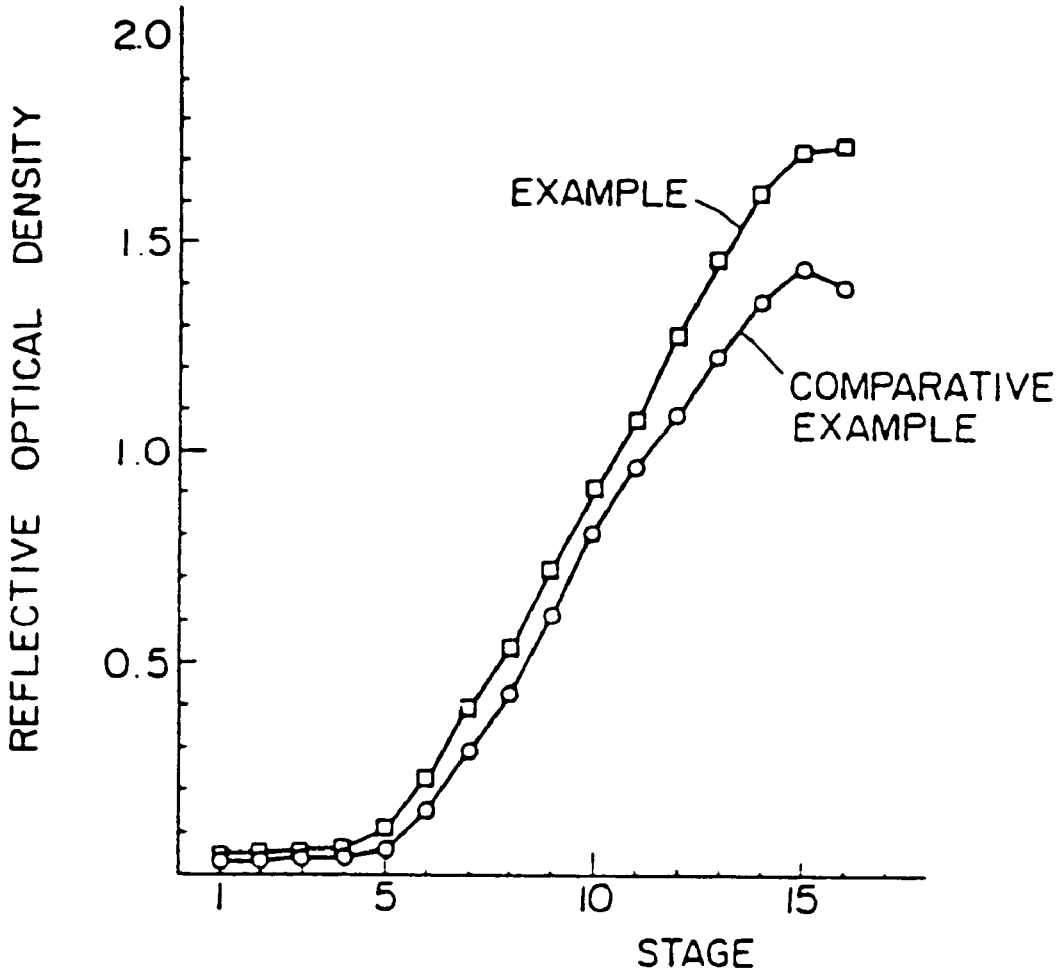
FIG. 22 is a graph of reflective optical density.

FIG. 21 shows the cutting portion (broken line portion) when the heat transferable sheet is to be cut from a continuous paper during manufacturing, and the detection mark 41f is also cut at the center when the sheet is cut along the broken line. Thus, the detection mark cut at the cutting section should preferably be liner at the side crossing the cutting line, since occurrence of shifting right or left in position of cutting, if any, can hardly be discriminated. The shape of a mark along such an object may be, in addition to those as shown in FIG. 21, square, rectangular, trapezoid, parallelogram and the like. Other than these, a shape which is small in change of shape in the vicinity of the cut portion can be used.

Detection of these detection marks can be done as in the case of the heat transfer sheet.

[C] Heat transfer recording process

The heat transfer recording process according to the present invention is a heat-sensitive recording process which performs printing by a dot-shaped heating means on a laminate of (a) a heat transfer sheet having a heat transfer layer comprising a substance which can be softened, melted or gasified by heating formed on a base sheet and (b) a heat transferable sheet to be used in combination with the above heat transfer sheet, having a receptive layer for receiving a dye migrated from the above heat transfer sheet on heating formed on a base sheet, to form an image on the above heat transferable sheet, which comprises reading the detection mark which is physically detectable formed on the above heat transfer sheet and/or the heat transferable sheet, laminating the above heat transfer sheet with the above heat transferable sheet in accordance with the information read and carrying out printing.

The above detection mark comprises an information which can be read magnetically, optically, electrically or mechanically, specifically an information such as direction, front or back of the sheet, residual amount of sheet, the positional relationship between the sheets, grade or kind of the sheet, recording initiating position, color, etc.

Thus, according to the process of the present invention, since heat transfer recording is performed following the information obtained by confirmation of the detection mark, it can be improved in operability to enable accurate and sure heat transfer recording.

While the dye of a quantity corresponding to the heat energy can be heat transferred to the receptive layer by the heat transfer recording described to record an image, a color image comprising a combination of various colors as in a color photograph can also be obtained by using the heat transfer printing sheets in the process described above, for example, sequentially using yellow, magenta, cyan and if necessary black heat transfer printing sheets to carry out heat transfer printing according to these colors. The changing of the heat transfer sheets having regions which are formed by previously separately painting in each color as shown in FIG. 11 is used in place of the heat transfer sheets having respective colors. First, a yellow separated image is heat transferred using the yellow region, then a magenta separated image is heat transferred using the magenta region of the heat transfer sheet, and such steps are repeatedly carried out to heat transfer yellow, magenta, cyan and if necessary black separated images.

The quality of the resulting image can be improved by suitably adjusting the size of the heat source which is used to provide heat energy, the contact state of the heat transfer sheet and the heat transferable sheet, and the heat energy.

By using in combination with the heat transferable sheet, the heat transfer sheet according to the present invention can be utilized in the print preparation of a photograph by printing, facsimile or magnetic recording systems wherein various printers of thermal printing systems are used or print preparation from a television picture.

In preparation of a print, signal processing is required to be performed in order to convert the image signals to the heat generated from thermal heads. The television signals of the system such as NTSC, SECAM or PAL or the television signals recorded on optical disc, magnetic disc or magnetic tape as the image signals are decoded to R, G, B (Red, Green, Blue) signals, and then the R, G, B signals are converted to C, M, Y (Cyan, Magenta, Yellow) signals to conform to the absorption wavelengths of the respective sublimating dyes to be used in the heat transfer sheet. If necessary, Bk (Black) signals are further taken out from R, G, B signals.

Whereas, the respective color developing hues of the respective sublimating dyes are all deviated from the ideal hues or the three primary colors of Cyan, Magenta and Green, no ideal tone can be realized only by convening R, G, B signals to their corresponding complementary colors of C, M, Y signals. Accordingly, it is effective to utilize the technique of masking and the technique of UCR (Under Color Removal) and other techniques. These techniques of masking and UCR are already known in the field of printing business, and they are techniques in printing for correction of the hues of the respective inks for the three primary colors deviated from the ideal hues of the three primary colors.

However, it is not satisfactory to use the technique of masking and the technique of UCR in printing and other techniques as such. For, R, G, B signals of the television signals are adapted to the emission spectrum of the fluorescent material used on a cathode-ray tube, and they are different in hues from R, G, B components as in transparency of an original in printing. Thus, it is necessary to convert R, G, B signals of the television signals to preferable C, M, Y signals obtained by color resolution filter in printing. More specifically, R, G, B signals of the television signals are first converted to signals corresponding to R, G, B components as in transparency of an original in printing, and the converted R, G, B signals are further processed by utilizing the technique of masking and the technique of UCR and other techniques to be converted to C, M, Y signals for printing and if necessary Bk (Black) signal. The signals thus obtained are digitalized to 64 stages or higher and then memorized.

When the present invention is utilized for facsimile, since the transparency of an original or print is first subjected to color resolution, processing in view of the spectral characteristics of the color filter is required. Otherwise, the same-processing as in the case of television signals can be used. digitalization and subsequent memory being similarly effected.

For example, a received television picture can be regenerated as a print of sheet form by storing the picture as signals of respective separated patterns in yellow, magenta, cyan and if necessary black in a storage medium such as a magnetic tape or a magnetic disc or IC memory, outputting the stored signals of the separated patterns, and imparting heat energy corresponding to these signals to the laminate of the heat transfer sheet and the heat transferable sheet by means of a heat source such as thermal heads to sequentially carry out heat transfer printing in all colors.

The movement of the heat transfer sheet and the heat transferable sheet within a thermal printer is as follows.

First, the heat transfer sheet is moved to be supplied. Detection of the heat transfer sheet is conducted by detecting the mark of the heat transfer layer to be used first among the heat transfer layers of respective colors coated separately on the heat transfer sheet, and then the heat transfer sheet is stopped at the position of the printing unit.

Separately, the heat transferable sheet is moved to be supplied. Detection of the heat transferable sheet is conducted by detecting the mark provided on the heat transferable sheet and the information of discrimination between front and back, discrimination between forward and rearward directions, paper size, quality and grade of paper, previously defined for the mark can be read. Inadequate heat transferable sheet is excluded, and only adequate heat transferable sheets are stopped at the starting position of the printing unit.

As described above, the heat transfer sheet and the heat transferable sheet can be not only subjected to discrimination between adequate and inadequate conditions or determination of the position through reading of the marks provided thereon, but also the information read can be utilized as described below.

For example, by reading from the mark whether the heat transferable paper is for common use (or ordinary use) or for high image quality use, or whether it is a transparent plastic film, a paper for correction of printing, a flexible synthetic paper or a rigid cellulose fiber paper, the heat energy during printing can be controlled. Since the heat energy necessary for printing is different depending on these uses or materials, tables of necessary energy versus image signals are previously prepared, and a table in conformity with the use and the material is selected, and a heat energy is given following the table, whereby a desired image reproduction can be always effected on a print, even if the use of the material may be changed.

Next, the heat transfer sheet and the heat transferable sheet run while being pressurized under an appropriate pressure of 5 to 10 kg/10 cm, preferably 7.0 to 8.5 kg/10 cm between the thermal heads and the platen roll, thereby effecting recording with the first color of one picture with the image signals of the first color progressive image stored in the memory. After recording with the first color, only the heat transferable sheet is returned to the starting position for confirmation of the second color of the transfer sheet. Then, running is performed in the same manner as described above to effect recording with the second color by the second image signal. Subsequently, by use of the third color and the fourth color of the transfer sheet, the above operations can be repeated similarly as above to give a print similar to the color photographic print.

If the heat transferable sheet is slipped out of place, the slippage can be detected for exchange of the heat transferable sheet with a new one to repeat again printing from the beginning.

It is also possible to provide a representation of residual sheet amount or an end mark near the end of the roll of the transfer sheet and output exhaustion of the sheet as a signal.

When the combination of the heat transferable sheet and the heat transfer sheet according to the present invention is used for printout of such a television picture, the use of a white receptive layer alone, a colorless transparent receptive layer backed with a base sheet such as paper as the heat transferable sheet is ordinarily convenient for obtaining a reflection image.

Furthermore, when the combination of letters, patterns, symbols, colors and the like formed on a CRT picture by the operation of a computer, or a computer-formed graphic pattern is utilized as an original, steps similar to those described above can be carried out. When the original is a fixed image such as a picture, photograph or printed matter, or an actual object such as persons, still life, or a landscape, the steps can be carried out via suitable means such as a video camera in the same manner as described above. Further, in producing the signal of each progressive pattern from an original, an electronic color scanner which is used for a photomechanical process of printing may be used.

EXPERIMENTAL EXAMPLES

EXAMPLE A-1

Forty (40) parts of calcium carbonate (manufactured by Shiroishi Calcium, Japan, under the trade name of Hakuenka DD) and 60 parts of a sodium salt of phosphate (manufactured by Toho Kagaku, Japan, under the trade name of GAFAC RD 720) were well kneaded together with a three-roll mill to prepare a filler-containing dispersion composition. Thereafter, an ink composition for a heat-resistant slipping layer having the following composition was prepared. The obtained ink composition for a heat-resistant slipping layer was coaled on a 9-micron thick polyethylene terephthalate film (manufactured by Toyobo, Japan, under the trade name of S-PET) with a wire bar No. 16, was then dried with warm air, and was further subjected to heat-curing for 48 hours in an oven of 60° C. The amount of the dried coating was then about 1.8 g/m$^2$.

| Ink Composition for Heat-Resistant Shipper Layer | |
|---|---|
| Polyvinyl Butyral (manufactured by Sekisui Kagaku, Japan under the trade name of BX-1) | 6 weight parts |
| Toluene | 47 weight parts |
| Methyl Ethyl Ketone | 47 weight parts |
| Said Filler-Containing Dispersion Composition | 1.2 weight parts |
| Phosphate not in the form of any salt (manufactured by Dai-tchi Kogyo Seiyaku, Japan, under the trade name of Prisurf A208S) | 1.2 weight parts |
| Isocyanate (75% Ethyl Acetate Solution of Colonate L. manufactured by Nippon Polyurethane, Japan) | 2.4 weight parts |
| Amine-Base Catalyst (Ethylene Dichloride Ethyl Acetate Solution of NY 3, 10, manufactured by Nippon Polyurethane, Japan) | 0.3 weight parts |

Subsequently, an ink composition for the formation of a heat sublimation transfer layer, having the following composition, was prepared, and was coated on the surface of the terephthalate film opposite to the heat-resistant slipping layer with a Wire bar No. 10, followed by warm-air drying. The coating amount of the transfer layer was then about 1.2 g/m$^2$.

| Ink for the Formulation of Sublimation Transfer Layer: | |
|---|---|
| Disperse Dye (manufactured by Nippon Kayaku, Japan, under the trade name of Kayaset Blue 714) | 4 weight parts |
| Polyvinyl Butyral (manufactured by Sekisui Kagaku, Japan, under the trade name of S-LEC BX-1) | 4.3 weight parts |
| Toluene | 40 weight parts |
| Methyl Ethyl Ketone | 40 weight parts |
| Isobutanol | 10 weight parts |

A synthetic paper sheet (manufactured by Ohji Yuka, Japan, under the trade name of YUPO-FPG 150) having a thickness of 150 microns was then used as the substrate, and was coated thereon with an ink for the formation of a receptive layer having the following composition in such a manner that the dry weight of the resulting coating was 4.0 g/m$^2$, was left as it is for one day, and then drying was carried out for 20 min at 100° C., thereby to obtain a heat transferable sheet.

| Ink for the Formulation of Receptive Layer: | |
|---|---|
| Vylon 200 (Polyester Resin manufactured by Toyobo, Japan) | 8 weight parts |
| Elvaloy 741P (EVA-Base Polymeric Plasticizer manufactured by Mitsui Polychemical, Japan) | 2 weight parts |
| Amino-Modified Silicon Oil (manufactured by Shin-etsu Silicone, Japan, under the trade name of KF-393) | 0.125 weight parts |
| Epoxy-Modified/silicone Oil (manufactured by Shin-etsu Silicone, Japan, under the trade name of X-22-343) | 0.125 weight parts |
| Toluene | 70 weight parts |
| Methyl Ethyl Ketone | 10 weight parts |
| Cyclohexanone | 20 weight parts |

The heat-sublimation transfer sheet and the heat transferable sheet, obtained as described above, were laminated upon each other with the heat transfer layer coming in contact with the receptive layer. Recording was then carried out from the heat-resistant slipping layer side by means of a thermal head under the conditions of an output of 1 w/dot, a pulse width of 0.3 to 4.5 milliseconds and a dot density of 3 dots/mm. As a result, it was noted that the heat transfer sheet could run smoothly without any sticking and wrinkling. The reflection density of a highly developed color density portion at a pulse width of 4.5 milliseconds was 1.65, and the reflection density of a portion at a pulse width of 0.3 millisecond was 0.16. Thus, a recording having gradation in accordance with applied energy was obtained (as measured by a Machbeth densitometer RD-918).

Furthermore, the aforesaid heat transfer sheet was around a sheet tube with the heat transfer layer coming into close contact with the heat resistant slipping layer, and was subjected to the testing for accelerated changes with time for 14 days in an oven of 50° C. As a result, it was noted that there was neither staining of the heat-resistant slipping layer due to migration of the dye contained in the heat transfer layer nor staining of the heat transfer layer due to migration of the surface active agent contained in the heat-resistant slipping layer.

The heat transfer sheet was carried on a carrying roll. As a result, it was noted that any wrinking due to the adherence therebetween did not occur at all.

EXAMPLE A-2

The same recording in Example A-1 was carried out, except that talc (manufactured by Nippon Talc, Japan, under the trade name of Microace L-1) was used in place of calcium carbonate to be contained in the filler-containing dispersion composition of Example A-1.

Neither sticking nor wrinkling was again observed. The same testing for accelerated changes with time as in Example A-1 indicated that no staining occurred.

EXAMPLE A-3

A heat transfer sheet was prepared in the same manner as in Example A-1, except that clay (manufactured by Tsuchiya Kaolin Japan, under the trade name of ASP170) was used in place of calcium carbonate to be contained in the filler-containing dispersion composition, and recording was carried out therewith. It was then found that neither sticking nor wrinkling occurred. The same testing for accelerated changes with time as in Example A-1 also indicated that any staining did not occur, as was the case with Example A-1.

COMPARISON EXAMPLE A-1

A heat transfer sheet was prepared in the same manner as in Example A-3, except that phosphate. not in the form of a salt, (manufactured by Toho Kagaku, Japan, under the trade name of GAFAC RS 710) was used in place of the sodium salt of a phosphate base compound (manufactured by Toho Kagaku, Japan, under the trade name of GAFAG RD 720) to be contained in the filler-containing dispersion composition, and recording was carried out therewith. It was then noted that neither sticking nor wrinkling occurred. However, the same testing for accelerated changes with time as in Example A-1 revealed that the dye contained in the heat transfer layer migrated into the heat-resistant slipping layer to cause coloring of the latter, and the dye separated from the dye ink layer to result in a variation in the dye concentration. When printing was conducted with such a heat transfer sheet, there were observed a variation in the quality of the resulting image and staining thereof.

EXAMPLE A-4

A heat transfer sheet was prepared in the same manner as in Example A-1, except that any phosphate, not in the salt form, was added to the ink composition for the formation of a heat-resistant slipping layer of Example A-1, and recording was carried out therewith. As a result, a product equivalent to the product of Example A-1 was obtained.

EXAMPLE A-5

Example A-2 was repeated. provided however that the dye to be contained in the ink of the formation of the heat-sublimation transfer layer was changed to 2.5 parts by weight of Macrolex Violet R (manufactured by Bayer) and 1.5 parts by weight of polyvinyl butyral. The printing density reached a high of 1.5. Other results were similar to those of Example A-2.

EXAMPLE A-6

Example A-2 was repeated, provided however that the dye to be dispersed into the ink for the formation of a heat-sublimation transfer layer was changed to 2.2 parts by weight of Waxoline Blue AP-FW (manufactured by ICI) and 4.0 parts by weight of polyvinyl butyral.

The printing density reached a high of 1.6. Other results were similar to those of Example A-2.

EXAMPLE A-7

Example A-2 was repeated, provided however that the dye to be dispersed in the ink for the formation of a heat-sublimation transfer layer was changed to 1.2 parts by weight of C.I. Disperse Blue 58 and 4.0 parts by weight of polyvinyl butyral.

The printing density reached a high of 1.45, and other results were similar to those of Example A-2.

EXAMPLE A-8

Example A-2 was repeated, provided however that the dye to be dispersed in the ink for the formation of a heat-sublimation transfer layer was changed to 4.6 parts by weight of PTY 52 manufactured by Mitsubishi Kasei, Japan, and 2.0 parts by weight of polyvinyl butyral. In recording, the pulse width of the thermal head was fixed to a value of 3.0 milliseconds.

Five recordings were made by repeatedly using the same portion of the obtained heat-sublimation transfer sheet, but employing a new heat transferable sheet for each recording.

The resulting printing density was 1.4 at the first recording, and 1.2 at the fifth recording. Thus, plural recording could be effected.

EXAMPLE B-1

By means of wire bar coating, an ink composition for a heat transfer layer, having the following composition. was applied on a support that was based on a 9-micron thick PET film (manufactured by Toyobo, Japan, under the trade name of S-PET) having one side subjected to corona discharge treatment in such a manner that the dry weight of the resulting coating was 1.0 g/m$^2$. After drying, that film was subjected on the back side to the same treatment as in Example A-2 to obtain a heat transfer sheet.

| Ink Composition for Heat Transfer Layer: | |
|---|---|
| Disperse Dye (manufactured by Nippon Kayaku, Japan, under the trade name of Kayaset Blue 714) | 4 weight parts |
| Polyvinyl Butyral (manufactured by Sekisui Kagaku, Japan, under the trade name of S-LEC BX-1) | 4.3 weight parts |
| Toluene | 40 weight parts |
| Methyl Ethyl Ketone | 40 weight parts |
| Isobutanol | 10 weight parts |

The polyvinyl butyral (BX-1) used herein had a molecular weight of about 100,000, a Tg of 83° C. and a vinyl alcohol content of about 20% by weight. The obtained heat transfer layer was transparent, and showed no sign of any particle under a microscope (×400).

A synthetic paper sheet having a thickness of 150 microns (manufactured by Ohji Yuka, Japan, under the trade name of YUPO-FPG-150) was used as a substrate. An ink composition for a receptive layer having the following composition, was applied onto that substrate by means of wire bar coating to a dry basis weight of 5 g/m$^2$, thereby to obtain a heat transferable sheet. Drying was carried out for one hour in an oven of 100° C. after pre-drying with a dryer. The solvent was volatilized off.

| | |
|---|---|
| Vylon 200 (Polyester Resin manufactured by Toyobo, Japan) | 8 weight parts |
| Amino-Modified Silicone Oil (manufactured by Shin-etsu Silicone, Japan, under the trade name of KF-393) | 0.125 weight parts |
| Epoxy-Modified Silicone Oil (manufactured by Shin-etsu Silicone, Japan, under the trade name of X-22-343) | 0.125 weight parts |
| Toluene | 70 weight parts |
| Methyl Ethyl Ketone | 10 weight parts |
| Cyclohexanone | 20 weight parts |

The heat transfer sheet and the heat transferable sheet, obtained as mentioned above, were superposed upon each other with the heat transfer sheet coming into contact with the receptive sheet. Recording was then carried out from the support side of the heat transfer sheet by means of a thermal head under the conditions of an output of 1 w/dot, a pulse width of 0.3 to 4.5 milliseconds and a dot density of 3 dots/mm. The reflection density of a highly developed color density portion at a pulse width of 4.5 milliseconds was 1.65, and the reflection density of a portion at a pulse width of 0.3 milliseconds was 0.16. Thus, a recording having gradation in accordance with applied energy was obtained (as measured by a Machbeth densitometer RD-918).

Even when the heat transfer sheet was peeled from the heat transferable sheet after printing with a thermal head, no migration of the resin in the heat transfer sheet was observed. Nor did any staining of the non-heated portions occur.

Even when a similar heat transfer sheet was allowed to stand for 30 days in a wound state in an oven of 60° C., no change in appearance and deterioration of recording performance or the like were observed. This showed that the heat transfer sheet obtained was of high practical value.

EXAMPLE B-2

An tnk composition for a heat transfer layer having the following composition was prepared, and was applied to a film similar to that of Example B-1 to a dry basis weight of 1.0 g/m$^2$.

| Ink Composition for Heat Transfer Layer: | |
|---|---|
| Disperse Dye (manufactured by Nippon Kayaku, Japan, under the trade name of Kayaset Blue 714) | 4 weight parts |
| Polyvinyl Butyral (manufactured by Sekisui Kagaku, Japan, under the trade name of S-LEC BX-1) | 4 weight parts |
| Ethyl Cellulose (manufactured by Hercules Incorporated, under the trade name of EC N-14) | 0.3 weight parts |
| Toluene | 40 weight parts |
| Methyl Ethyl Ketone | 40 weight parts |
| Isobutanol | 10 weight parts |

With a heat transfer sheet obtained from that composition, recording was carried out in a manner similar to that of Example B-1. As a result, the same recording performance as that obtained in Example B-1, and no problem arose in connection with stability with time.

EXAMPLE C-1

Preparation was an ink composition 1 for a heat-resistant layer having the following composition (part by weight), which was in turn applied on a 4.5-micron thick polyethylene terephthalate film used as a base film with the use of a Wire bar No. 8, followed by warm-air drying.

| Ink Composition I for Heat-Resistant Layer | |
|---|---|
| Acryl Polyol "45% solution of Acrit 6416 MA manufactured by Taisei Kako, Japan" | 41.2 weight parts |
| Toluene | 26.3 weight parts |
| Methyl Ethyl Ketone | 26.3 weight parts |
| Diisocyanate "45% Ethyl Acetate Solution of Colonate L" (manufactured by Nippon Polyurethane) | 6.2 weight parts |

Prepared then was an ink composition I for a heat-resistant slippimg layer having the following composition, which was in turn applied on a coating of the ink composition I for a heat-rcsistant layer with the use of a Wire bar, followed by warm-air drying.

| Ink Composition I for Heat-Resistant Slipping Layer: | |
|---|---|
| Polyvnyl Butryal Resin "S-LEC BX-1" | 5.7 weight parts |
| Toluene | 43.1 weight parts |
| Methyl Ethyl Ketone | 43.1 weight parts |
| Phosphate "Prisurf A-208S" (manufactured by Dai-ichi Kogyo Seiyaku, Japan) | 1.3 weight parts |
| Sodium Salt of Phosphate "GAFAC RD 720" (manufactured by Toho Kagaku, Japan) | 1.7 weight parts |
| Talc "Microace L-1" (manufactured by Nippon Talc, Japan) | 1.2 weight parts |
| Amine-Base Catalyst "Desmorapid PP" (manufactured by Sumitomo Bayer Urethane, Japan) | 0.1 weight parts |
| Diisocyanate "45% Ethyl Acetate Solution of Colonate L" (manufactured by Nippon Polyurethane, Japan) | 3.8 weight parts |

For curing, this film was further heated at 60° C. for 12 hours in an oven. The dry weight of the ink coating was then about 1.2 g/m$^2$ (2.7 g/m$^2$ in all).

Apart from this, an ink composition for the formation of a heat-sensitive sublimation transfer layer having the following composition was prepared, and was coated on the surface of the base film opposite to the heat-resistant layer by means of a Wire bar No. 10, followed by warm-air drying. The amount of the transfer coating layer applied was about 1.2 g/m$^2$.

| Ink for the Formation of Heat-Sensitive Sublimation Transfer layer: | |
|---|---|
| Disperse Dye "Kayaset Blue 714" (manufactured by Nippon Kayaku, Japan) | 4 weight parts |
| Polyvinyl Butyral Resin "S-LEC BX-1" | 4.3 wt. parts |
| Toluene | 40 wt. parts |
| Methyl Ethyl Ketone | 40 wt. parts |
| Isobutanol | 10 wt. parts |

On the other hand, use was made of a base film consisting of a synthetic paper sheet having a thickness of 150 microns "YUPO-FPG" (manufactured by Ohji Yuka, Japan), on which an ink for the formation of a receptive layer, having the following composition, was applied to a dry basis weight of 4.0 g/m$^2$ with the use of a wire bar No. 36, thereby obtaining a heat transferable sheet.

| Ink for the Formation of Receptive Layer: | |
|---|---|
| Polyester Resin "Vylon 200" (manufactured by Toyobo, Japan) | 10 wt. parts |
| Amino-Modified Silicone Oil "KF-393" (manufactured by Shin-etsu Silicone, Japan) | 0.125 wt. parts |
| Epoxy-Modified Silicone Oil "X-22-343" (manufactured by Shin-etsu Silicone, Japan) | 0.125 wt. parts |
| Toluene | 70 wt. parts |
| Methyl Ethyl Ketone | 30 wt. parts |

The heat-sensitive sublimation transfer sheet and heat transferable sheet, obtained as mentioned above, were superposed upon each other with the heat transfer layer coming into contact with the receptive layer. Recording was then carried out from the heat-resistant layer side. The recording conditions were an output of 1W/dot, a pulse width of 0.3 to 4.5 milliseconds and a dot density of 3 dot/mm.

The heat-sensitive transfer sheet could run smoothly without any sticking and wrinkling. The reflection density of a highly developed color density portion at a pulse width of 4.5 milliseconds was 1.65, and the reflection density of a portion at a pulse width of 0.3 millisecond was 0.16. Thus, a recording having gradation in accordance with applied energy was achieved (as measured by a Mlachbeth densitometer RD-918).

EXAMPLE C-2

Example C-1 was repeated, provided however that 4 parts by weight of talc were added to the ink composition I for a heat-resistant layer.

Like Example C-1, no sticking occurred.

EXAMPLE D-1

A solution of a thermosetting acrylic resin in toluene was applied on one side of a 6-micron thick polyethylene terephthalate film to a dry basis weight of about 2 g/m$^2$, followed by drying, and an alcoholic solution of an antistatic agent consisting of a cation type polyacrylate resin was applied on the resulting coating to a dry basis weight of about 0.3 g/m$^2$. Subsequent drying gave a heat-resistant layer.

On the opposite side there was applied a coating material for a transfer layer having the following composition to a jolid content of 1.0 g/m$^2$. Drying gave a heat transfer sheet in a wound state.

| Coating Material for Transfer Layer: | |
|---|---|
| Disperse Dye "KST-B-136" | 4 weight parts |
| Ethylhydroxyethyl Cellulose | 6 weight parts |
| Methyl Ethyl Ketone/Toluene (1:1) | 90 weight parts |

A solution of a saturated polyester resin in methyl ethyl ketone/toluene (1:1) was applied on one side of a cast coat paper sheet (having a weight of 110 g/m$^2$) to a dry basis weight of 10 g/m$^2$. Drying yielded a heat transferable sheet.

With the arrangement wherein the coloring matter layer of the wound heat transfer sheet was laminated with the receptive layer surface of the heat transferable sheet in face to face relationship, an image was recorded by means of a thermal printer. No substantial wrinkling of the heat transfer sheet occurred. Nor did any deposition of dust take place. Thus, the obtained image was free from any variation in quality, and had beautiful gradation. Any unsatisfactory running due to static electricity did not occur in the printer.

COMPARISON EXAMPLE D-1

In a manner similar to that of Example D-1 recording was carried out without using any antistatic agent. In addition of the occurrence of noticeable wrinkling of the heat transfer sheet, dust deposition was found. In the portions corresponding to wrinkled and dust-deposited portions, the image was not printed uniformly. Thus, no satisfactory image was obtained.

EXAMPLE D-2

A polyethylene terephthalate film having a thickness of 9 microns was applied on one side with a coating material for a back surface layer having the following composition, with which electrically conductive zinc oxide was kneaded, to a solid content of 3 g/m$^2$, followed by drying.

| Coating Material for Back Surface Layer; | |
|---|---|
| Polyvinyl Butyral | 5 weight parts |
| Electrically Conductive Zinc Oxide | 15 weight parts |
| Toluene/Methyl Ethyl Ketone (1.1) | 50 weight parts |

On the opposite surface there was applied the same coating material for a transfer layer as used in Example D-1 to a dry basis weight of 1.0 g/m$^2$, followed by drying, thereby obtaining a roll of heat transfer sheet.

Results similar to those in Example D-1 were obtained even with this heat transfer sheet.

EXAMPLE E-1

Example C-1 was repeated. However, the compositions given in the following table were used for the ink for the formation of heat-sensitive sublimation transfer layers, and gravure printing was carried out in such a manner that three heat-sensitive sublimation transfer layers different in tint from one another were repeatedly arranged. In this manner, a heat-sensitive sublimation transfer sheet was obtained, wherein the amount of the transfer coating of each tint was as follows.

| | |
|---|---|
| Cyan | 1.2 g/m$^2$ |
| Magenta | 1.0 g/m$^2$ |
| Yellow | 0.8 g/m$^2$ |

| | Cyan | | Magenta | | Yellow | |
|---|---|---|---|---|---|---|
| Dye | Kayaset Blue 714 | 5.00 | MS Red G | 2.60 | Foron Brilliant Yellow S-6GL | 5.50 |
| Dye | | | Macrolex Red Violet | 1.40 | | |
| Polyvinyl Butyral | | 3.92 | | 4.32 | | 4.52 |
| Solvent MEK | | 22.54 | | 43.34 | | 48.49 |
| Solvent Toluene | | 50.18 | | 43.34 | | 41.49 |
| Solvent MIBK | | 13.00 | | | | |
| Solvent Xylene | | 5.00 | | | | |
| Solvent n-Propanol | | | | 5.00 | | |
| Total | | 100.00 | (weight %) | 100.00 | | 100.00 |

MEK = Methyl Ethyl Ketone
MIBK = Methyl Isobutyl Ketone

On the other hand, a composition for the formation of to an intermediate layer, having the following composition, was applied on the same synthetic paper as used in Example C-1 to a dry basis weight of 10 g/m$^2$ to obtain an intermediate layer. Subsequently, a composition for a receptive layer, having the following composition, was applied on that intermediate layer to a dry basis weight of 5 g/m$^2$ to prepare a receptive layer. In this manner, a heat transferable sheet was obtained.

| Composition for Receptive Layer | |
|---|---|
| Polyester Resin (Vylon 200, manufactured by Toyobo, Japan) | 7 weight parts |
| Vinyl Chloride/Vinyl Acetate Copolymer Resin (Vinylite VYHH, manufactured by Union Carbide) | 3 weight parts |
| Amino Modified Silicone (KF-393, manufactured by Shin-etsu Kagaku Kogyo, Japan) | 0.5 weight parts |
| Epoxy-Modified Silicone (S-22-343, manufactured by Shin-etsu Kagaku Kogyo, Japan) | 0.5 weight parts |
| Solvent (Toluene/Methyl Ethyl Ketone (1.1) | 89 weight parts |

Recording was carried out in accordance with Example C-1. As regards -he printing density, the highest density was 1.6 for cyan, 1.4 for magenta and 1.5 for yellow.

Furthermore, when the said heat-sensitive sublimation transfer sheet was prepared, the polyethylene terephthalate film was subjected to corona discharge treatment on both its sides, and a polyester resin was applied thereon as 0.2 g/m$^2$ (dry basis) primers, thus resulting in improvements in adherence.

EXAMPLE E-2

Example C-1 was repeated. However, the thickness of the polyethylene terephthalate film was changed to 6 microns, the compositions given in the following table were used as the ink for the formation of heat-sensitive sublimation transfer layers, and three heat-sensitive sublimation transfer layers different in tint from one another were repeatedly arranged. In this manner, a heat-sensitive sublimation transfer sheet was obtained, wherein the coating amount of each color was as follows.

| | |
|---|---|
| Cyan | 1.2 g/m$^2$ |
| Magenta | 1.0 g/m$^2$ |
| Yellow | 0.8 g/m$^2$ |

| | Cyan | | Magenta | | Yellow | |
|---|---|---|---|---|---|---|
| Dye | Kayaset Blue 714 | 4.80 | MS Red G | 2.86 | Foron Brilliant Yellow S-6GL | 6.00 |
| Dye | Fogon Brilliant Blue S-R | 1.00 | Macrolex Red Violet | 1.56 | | |
| Polyvinyl Butyral | | 4.60 | | 4.32 | | 4.52 |
| PVDC powder | | 0.40 | | 0.40 | | 0.40 |
| Solvent MEK | | 44.80 | | 43.34 | | 43.99 |
| Solvent Toluene | | 44.80 | | 42.92 | | 40.99 |
| Solvent Cyclohexanone | | | | 5.00 | | 4.50 |
| Total | | 100.00 | | 100.00 | | 100.00 |

PVDC = Poly Vinylidene Chloride

The heat transferable sheet provided included an intermediate layer obtained by using an ink composition for the formation of an intermediate layer having the composition (D) of Example P-1 (the dry basis weight of that intermediate layer was 5.0 g/m$^2$).

Recording was carried out in accordance with Example C-1. As regards the printing density, the highest density was 1.70 for cyan, 1.50 for magenta and 1.60 for yellow.

EXAMPLE E-3

A heat-sensitive sublimation transfer sheet was obtained by repeating Example C-2. However, a polyethylene terephthalate film having a thickness of 6 microns was used, the compositions given in the following table were used as the ink for the formation of heat-sensitive sublimation transfer layers, and printing was carried out in such a manner that three heat-sensitive sublimation transfer layers different in tint from one another were repeatedly arranged.

The coating amount of each color was as follows:

| | |
|---|---|
| Cyan | 1.6 g/m$^2$ |
| Magenta | 1.3 g/m$^2$ |
| Yellow | 1.1 g/m$^2$ |

| | Cyan | | Magenta | | Yellow | |
|---|---|---|---|---|---|---|
| Dye | Waxoline Blue AP-TW | 6.30 | MS Red G | 2.40 | PTY-52 | 5.50 |
| Dye | Kayaset Blue 714 | 1.72 | Sudan Red 7B | 3.10 | | |
| Polyvinyl Butyral | | 5.31 | | 4.80 | | 4.80 |
| Polyethylene Wax | | 1.00 | | 1.00 | | 1.00 |
| Solvent MEK | | 30.52 | | 44.85 | | 55.00 |
| Toluene | | 45.75 | | 44.85 | | 34.70 |
| MIBK | | 10.40 | | | | |
| Total | | 100.00 | | 100.00 | | 100.00 |

On the other hand, a heat transferable sheet was prepared in the following manner. An ink composition for the formation of a receptive layer, having the following composition, was applied on synthetic paper of YUPO-FPG 150 (manufactured by Ohji Yuka, Japan) to form a receptive layer of 6 g/m$^2$ on dry basis.

| Ink Composition for the Formation of Receptive Layer | |
|---|---|
| Polyester Resin (Vylon 200, manufactured by Toyobo, Japan) | 1.0 wt. parts |
| Zinc white | 0.5 wt. parts |
| Methyl Ethyl Ketone | 4.5 wt. parts |
| Toluene | 4.5 wt. parts |

An ink composition for the formation of a releasing layer, having the following composition, was applied on the thus formed receptive layer to a dry basis weight of 0.2 g/m$^2$, and curing was carried out by heating at 110° C. for 20 minutes to form a releasing layer, whereby a heat transferable sheet was obtained.

| Ink Composition for the Formation of Releasing Layer | |
|---|---|
| Silicone Resin (KS 778, manufactured by Shin-etsu Kagaku Kogyo, Japan) | 100 wt. parts |

-continued

| Ink Composition for the Formation of Releasing Layer | |
|---|---|
| Catalyst (PL-8, manufactured by Shin-etsu Kagaku Kogyo, Japan) | 2 wt. parts |
| Toluene | 320 wt. parts |

For recording, the pulse width of a thermal head was fixed to 3.0 milliseconds. Repeated recording was effected by using the same portion of the obtained heat-sensitive sublimation sheet and employing a new heat transferable sheet for each recording. The printing density was 1.5 for cyan, 1.3 for magenta and 1.3 for yellow at the first recording, and 1.3 for cyan, 1.0 for magenta and 1.1 for yellow at the fifth recording. Thus, plural recordings could be effected.

In this example, since the receptive layer of the heat transfer sheet contained a pigment (zinc white) and included as the releasing layer thereon the silicone resin layer, no damage was given to the surfaces of the heat-sensitive sublimation transfer layer and the receptive layer, even when a shearing force acted upon between both sheets during recording (said force being caused by a difference in the feed rate which was caused by an unbalanced change in the feed and discharge tension of the sheet in the printer). Nor was there any drop of the performance of both sheets. The presence of a lubricating agent such as polyethylene wax in the heat-sensitive transfer layer also served to prevent damage.

EXAMPLE P-1

Preparation of Heat Transfer Sheets

An ink composition for the formation of a heat transfer layer having the following composition was applied on the back side of a 9-micron thick PET subjected to heat-resistant treatment to a dry basis weight of 1.0 10 g/m$^2$, and was then dried to obtain a heat transfer sheet.

| | |
|---|---|
| Disperse Dye: KST-B-136 (manufactured by Nippon Kayaku, Japan) | 0.4 wt. parts |
| Ethylhydroxyethyl Cellulose N14 (manufactured by Hercules) | 0.6 wt. parts |
| Methyl Ethyl Ketone Toluene (weight ratio of 1.1) | 9.0 wt. parts |

Preparation of Heat Transferable Sheets

The substrate used was synthetic paper (manufactured by Ohji Yuka, Japan, under the trade name of Yupo-FPG No. 150). Each of the following ink compositions (A)–(I) for the formation of intermediate layers was independently applied on that substrate to a dry basis weight of 10 g/m$^2$, followed by drying. Thereafter, an ink composition for the formation of a receptive layer, having the following composition, was applied onto the resulting coating, and was dried at 100° C. for 10 minutes to prepare a receptive layer having a dry basis weight of 4.5 g/m$^2$. In this manner, a heat transferable sheet was obtained.

| Ink Composition for the Furmation of Receptive Layer | |
|---|---|
| Polyester Resin Vylon 200 (manufactured by Toyobo, Japan, Tg = 67° C.) | 0.5 wt. parts |
| Polyester Resin, Vylon 290 (manufactured by Toyobo, Japan, Tg = 77° C.) | 0.5 wt. parts |
| Amino-Modified Silicone KF 857 (manufactured by Shin-etsu Kagaku Kogyo) | 0.04 wt. parts |
| Epoxy-Modified Silicone: KF 103 (manufactured by Shin-etsu Kagaku Kogyo) | 0.04 wt. parts |
| Methyl Ethyl Ketone/Toluene/ Cyclohexanone (weight ratio of 4.4:2) | 9.0 wt. parts |

-continued

| Ink Compositions for the Formation of Intermediate Layers | | |
|---|---|---|
| (A) | Polyurethane Resin (manufactured by Nippon Polyurethane, Japan, under the trade name of Nippolan 2301) | 10.0 wt. parts |
| | Solvent (DMF/MEK = 1:1) | 90 wt. parts |
| (B) | Polyurethane Resin (Nippolan 2314) | 10 wt. parts |
| | Solvent (the same as (A)) | 90 wt. parts |
| (C) | Polyurethane (Nippolan 5109) | 10 wt. parts |
| | Solvent (the same as (A)) | 90 wt. parts |
| (D) | Polyester Resin (Vylon 200) | 10 wt. parts |
| | Solvent (Toluene/MEK = 1:1) | 90 wt. parts |
| (E) | Polyester Resin (Vylon 200) | 8 wt. parts |
| | Polyester Resin (Vylon 600) | 2 wt. parts |
| | Solvent (the same as (D)) | 90 wt. parts |
| (F) | Ethylene/Vinyl Acetate Copolymer Resin (manufactured by Mitsui Polychemical, Japan, under the trade name of Elvaloy U-741 P) | 20 wt. parts |
| | Solvent (MEK/Toluene = 1.1) | 80 wt. parts |
| (G) | Linear Polyurethane Resin (manufactured by Sumitomo Bayer Urethane, Japan under the trade name of Desmocol 530) | 10 wt. parts |
| | Solvent (MEK) | 90 wt. parts |
| (H) | Caprolacton-Base Polyurethane (manufactured by Daiseru Kagaku Kogyo, Japan, under the trade name of Purakuseru EA-1422) | 10 wt. parts |
| | Solvent (MEK) | 90 wt. parts |
| (I) | Thermopolastic Polyurethane Resin (manufactured by Dai-Nippon Ink Kagaku Kogyo, Japan, under the trade name of Pandex T-52605-35MT) | 8 wt. parts |
| | Titanium Dioxide | 2 wt. parts |
| | Solvent (MEK) | 90 wt. parts |

With various combinations of the heat transfer sheets with the heat transferable sheets, both obtained as mentioned above, printing was carried out by means of a thermal head under the conditions of an output of 1 w/dot, a pulse width of 0.3 to 4.5 milliseconds and a dot density of 3 dots/mm. The results are set forth in Table P-1 together with 100% modulus of the resin in the intermediate layers and the coating amounts of the intermediate layers.

TABLE P-1

| 100% modulus of the resin | Coating amounts of the intermediate layers | | Reproducibility of dots |
|---|---|---|---|
| (A) | 70 kg/cm$^2$ | 3 g/m$^2$ | ○ |
| (B) | 19 kg/cm$^2$ | 3 g/m$^2$ | ○ |
| (C) | 200 kg/cm$^2$ | 3 g/m$^2$ | X |
| (D) | 110 kg/cm$^2$ | 3 g/m$^2$ | Δ |
| (E) | 100 kg/cm$^2$ | 3 g/m$^2$ | ○ |
| (F) | 21 kg/cm$^2$ | 10 g/m$^2$ | ○ |
| (G) | 65 kg/cm$^2$ | 3 g/m$^2$ | ○ |
| (H) | 25 kg/cm$^2$ | 5 g/m$^2$ | ○ |
| (I) | 50 kg/cm$^2$ | 3 g/m$^2$ | ○ |

○: good
Δ: medium
X: worst

EXAMPLE P-2

Similar results were obtained by repeating Example P-1, except that an ink composition for the formation of a receptive layer of the following composition was used for the receptive layer of a heat transferable sheet.

| Ink Composition for the Formation of Receptive Layer | |
|---|---|
| Vylon 290 (Polyester Resin manufactured by Toyobo) | 8 weight parts |
| Aerosil (Finely Divided Silica manufactured by Nippon Aerosil, Japan: specific surface area: 130 $m^2/g$ and mean particle size: 16 microns) | 0.4 weight parts |
| KF-393 (Amino-Modified Silicone Oil manufactured by Shin-etsu Silicone, Japan) | 0.2 weight parts |
| X-22-393 (Epoxy-Modified Silicone Oil manufactured by Shin-etsu Silicone, Japan) | 0.2 weight parts |
| Toluene | 35 weight parts |
| Methyl Ethyl Ketone | 35 weight parts |
| Cyclohexanone | 30 weight parts |

EXAMPLE P-3

Similar results were obtained by repeating Example P-1, except that an ink composition for the formation of an intermediate layer of the following composition was used for the intermediate layer of a heat transferable sheet.

| Ink Composition for the Formation of Intemediate Layer | |
|---|---|
| Vynalol MD-1930 (Aqueous Dispersion of Polyester Resin manufactured by Toyoboseki, Japan) | 67 wt. parts (on dry basis) |
| Acnalol YJ-1100D (Acrylic Emulsion manufactured by Yuka Badische) | 33 wt. parts (on dry basis) |

With a reflection type densitometer (RD-918, manufactured by Macbeth), examination was made of the gradation reproducibility of the products or Example P-1, wherein (F) was used as the ink composition for the formation of an intermediate layer, and the provision of the receptive layer alone was made without recourse to any intermediate layer. The results are set forth in FIG. 2, from which it is found that the presence of the intermediate layer leads to a 0.1 to 0.25 increase in density, as compared with the absence of any intermediate layer. which means that the amount of noises due to dewhitening (i.e. non-recorded part due to dust) is reduced, and the reproducibility of dots is improved.

EXAMPLE Q-1

As the substrate or base film, use was made of a polyethylene terephthalate film (S-PET, manufactured by Toyobo, Japan) having a thickness of 6 microns, which was subjected to corona discharge treatment on one side. By means of wire bar coating, a heat transfer layer composition having the following composition was applied on the corona-discharged side of that substrate to a thickness of 1 micron on dry basis to form a heat transfer layer. On the opposite side two drops of silicone oil (X-41-403A, manufactured by Shin-etsu Silicone, Japan) by means of a dropper, and were allowed to spread thereover to form a lubricating layer. In this manner, a heat transfer sheet was prepared.

| Heat Transfer Layer Composition | |
|---|---|
| Disperse Dye (Kayaset Blue 136, manufactured by Nippon Kayaku, Japan) | 4 weight parts |
| Ethylhydroxyethyl Cellulose (manufactured by Hercules) | 5 weight parts |
| Toluene | 40 weight parts |
| Methyl Ethyl Ketone | 40 weight parts |
| Dioxane | 10 weight parts |

On the other hand, a receptive layer composition having the following composition was applied on the surface of a substrate formed by 150-micron thick synthetic paper (YUPO-FPG-150, manufactured by Ohji Yuka, Japan) to a thickness of 4 microns on dry basis by means of wire bar coating. After pre-drying with a dryer, 30-minute drying in an oven of 100° C. gave a receptive layer. In this manner, a heat transferable sheet was prepared.

| Receptive Layer Composition | |
|---|---|
| Vylon 200 (Saturated Polyester manufactured by Toyobo, Japan; Tg = 67° C.) | 5.3 wt. parts |
| Vylon 290 (Saturated Polyester manufactured by Toyobo, Tg = 77° C.) | 5.3 wt. parts |
| Vinylite VYHH (Vinyl Chloride/Vinyl Acetate Copolymer manufactured by Union Carbide) | 4.5 wt. parts |
| KF-393 (Amino-Modified Silicone Oil manufactured by Shin-etsu Silicone, Japan) | 1.1 wt. parts |
| X-22-343 (Epoxy-Modified Silicone Oil manufactured by Shin-etsu Silicone, Japan) | 1.1 wt. parts |
| Toluene | 30 wt. parts |
| Methyl Ethyl Ketone | 30 wt. parts |
| Cyclohexanone | 22 wt. parts |

The heat transfer sheet and the heat transferable sheet, obtained as mentioned above, were superposed upon each other with the heat transfer layer coming in contact with the receptive layer. Heating was then applied from the support side of the heat transfer sheet by means of a thermal head under the conditions of an output of 1w/dot, a pulse width of 0.3 to 4.5 milliseconds and a dot density of 3 dots/mm to transfer the disperse dye of a cyan color contained in the transfer layer of the heat transfer sheet into the receptive layer of the heat transferable sheet, whereby a clear image of a cyan color was obtained. Under the conditions as specified below. light-resisting, and heat-and moisture-resisting testings were made of the image transferred onto the heat transferable sheet. The results of measurement of the degree of discoloration of the image after light-resisting testing and the results of measurement of the Hunter whiteness degree of the heat transferable sheet before printing and after light-resisting and heat- and moisture-resisting testings are set forth in Table 1 for the purpose of comparison.

Light-Resisting Testing:

Each sample was exposed to light for 10 hours according to the conditions of JIS L0842.

Heat- and Moisture-Resisting Testing:

Each sample was held for 100 hours in an atmosphere of 40° C. and relative humidity 90%.

It is noted that the degree of discoloration is defined in terms of 100× the density of image after testings/the density of image just after printing, both densities being measured with a Macbeth reflection type densitometer (RD-918).

Furthermore, quality paper for dry electrostatic reproduction was laminated on the heat transferable sheet having the image transferred thereonto on its receptive side, and was allowed to stand for 3 days in an oven of 60° C. with the application of a pressure of 30 g/cm$^2$. After the resulting sheet product had been removed from within the oven, the quality paper was peeled out of the heat transferable sheet to measure the density of the image re-transferred onto the quality paper with the same Macbeth densitometer as used in the foregoing. The results are also set forth in Table Q-1.

EXAMPLE Q-2

By means of wire bar coating, a receptive layer composition having the following composition was applied on a substrate similar to that of Example Q-1 to a thickness of 10 microns on dry basis, and was then dried to obtain a receptive layer.

| Receptive Layer Composition | |
|---|---|
| Vylon 200 (Saturated Polyester manufactured by Toyobo, Tg = 67° C.) | 5.3 wt. parts |
| Vylon 290 (Saturated Polyester manufactured by Toyobo, Japan; Tg = 77° C.) | 5.3 wt. parts |
| Vinylite VYHH (Vinyl Chloride/Vinyl Acetate Copolymer manufactured by Union Carbinde) | 4.5 wt. parts |
| Toluene | 30 wt. parts |
| Methyl Ethyl Ketone | 30 wt. parts |
| Cyclohexanane | 22 wt. parts |

Subsequently, a release agent composition having the following composition was applied on a portion of the surface of the receptive layer to a thickness of 0.5 microns on dry basis, and was then dried to obtain a release agent layer, whereby a heat transrerable sheet was prepared.

With the use of a heat transfer sheet similar to that of Example Q-1, transference was applied onto the portion of the heat transferable sheet on which the release agent layer had been formed, whereby a clear cyan color could be transferred onto that portion. Other recording could be made on the portion of the heat transferable sheet on which no release agent layer had been formed with the use of dot impact or heat-sensitive melting transfer system, or with the use of a pencil.

With this heat transferable sheet. light-resisting, heat- and moisture-resisting and re-transferable testinigs were carried out under the same conditions as in Example Q-1. The results are set forth in Table Q-1.

EXAMPLE Q-3

By means of wire bar coatng, a receptive layer composition having the following composition was applied onto a substrate similar to that of Example 1 to a thickness of 4 microns on dry basis, and was then dried to prepare a heat transferable sheet.

| Receptive Layer Composition | |
|---|---|
| Vylon 200 (Saturated Polyester manufactured by Toyobo, Japan; Tg = 67° C.) | 5.3 wt. parts |
| Vylon 290 (Saturated Polyester manufactured by Toyobo, Japan; Tg = 77° C.) | 5.3 wt. parts |
| Vinylite VYHH (Vinyl Chloride/Vinyl Acetate Copolymer manufactured by Union Carbide) | 4.5 wt. parts |
| Titanium Oxide (KA-10 manufactured by Titantum Kogyo) | 1.5 wt. parts |
| KF-393 (Amino Modified Silicone Oil manufactured by Shin-etsu Silicone, Japan) | 1.1 wt. parts |
| X-22-343 (Epoxy-Modified Silicone Oil manufactured by Shin-etsu Silicone, Japan) | 1.1 wt. parts |
| Toluene | 30 wt. parts |
| Methyl Ethyl Ketone | 30 wt. parts |
| Cyclohexanone | 22 wt. parts |

With the use of a heat transfer sheet similar to that of Example Q-1, transfer was applied onto this heat transferable sheet under similar conditions, whereby a clear cyan color was transferred thereonto. Under similar conditions, light-resisting, heat- and moisture-resisting, and re-transferable testings were applied with this heat transferable sheet. The results are given in Table Q-1.

EXAMPLE Q-4

By means of wire bar coating, a receptive layer composition having the following composition was applied onto a substrate similar to that of Example Q-1 to a thickness of 4 microns on dry basis, and was then dried to obtain a heat transferable sheet.

| Receptive Layer Composition: | |
|---|---|
| Vylon 200 (Saturated Polyester manufactured by Toyobo, Japan; Tg = 67° C.) | 5.3 wt. parts |
| Vylon 290 (Saturated Polyester, manufactured by Toyobo, Japan. Tg = 77° C.) | 5.3 wt. parts |
| Vinylite VYHH (Vinyl Chloride/Vinyl Acetate Copolymer, manufactured by Union Carbide) | 4.5 wt. parts |
| 2-(2'-hydroxy-5'-t-octylphenyl)-benzotnazole (U V Absorber) | 0.8 wt. parts |
| KF-393 (Amino-Modified Silicone Oil manufactured by Shin-etsu Silicone, Japan) | 1.1 wt. parts |
| X-22-343 (Epoxy-Modified Silicone Oil, manufactured by Shin-etsu Silicone, Japan) | 1.1 wt. parts |
| Toluene | 30 wt. parts |
| Methyl Ethyl Ketone | 30 wt. parts |
| Cyclohexanone | 22 wt. parts |

With the use of a heat transfer sheet similar to that of Example Q-1, transference was applied onto this heat transferable sheet under similar conditions, whereby a clear cyan color was transferred thereonto. Under similar conditions, light-resisting, heat- and moisture-resisting, and re-transferable testings were applied with this heat transferable sheet. The results are given in Table Q-1.

EXAMPLE Q-5

By means of wire bar coating, an intermediate layer composition having the following composition was applied onto a substrate similar to that of Example Q-1 to a thickness of 10 microns on dry basis, and was then dried to prepare an intermediate layer.

| Intermediate Layer Composition | |
|---|---|
| Elvaloy 742 (Ethylenic Resin Tg = 32° C.) | 15.0 wt. parts |
| Toluene | 42.5 wt. parts |
| Methyl Ethyl Ketone | 42.5 wt. parts |

Subsequently, a receptive layer composition similar to that of Example Q-1 was applied onto the intermediate layer to a thickness of 4 microns by means of wire bar coating., and was then dried to form a receptive layer, whereby a heat transferable sheet was prepared.

With the use of a heat transfer sheet similar to that of Example Q-1, transfer was applied onto this transferable sheet under similar conditions, whereby a clear cyan color was transferred thereonto. The obtained image had limited noise, and was of improved information reproducibility and enhanced quality. With this heat transferable sheet, light-resisting, heat- and moisture-resisting, and re-transferable testings were applied under similar conditions. The results are given in Table Q-1.

COMPARISON EXAMPLE Q-1

In accordance with Example Q-1, a heat transferable sheet was obtained by applying a receptive layer composition similar to that of Example Q-1 onto a substrate similar to that of Example Q-1 to a thickness of 5 microns on dry basis with the use of wire bar coating. However, any vinyl chloride/vinyl acetate copolymer was not used.

With the use of a heat transfer sheet similar to that of Example Q-1, transference was applied onto this heat transferable sheet under similar conditions. With this heat transferable sheet, light-resisting, heat- and moisture-resisting, and re-transferable testings were subsequently applied under similar conditions. The results are set forth in Table Q-1.

TABLE Q-1

| | | Hunter Whiteness Degree | | | |
|---|---|---|---|---|---|
| | Dis-color-ation (%) | Before Printing | After Light Resisting Test | After Heat and Moisture-Resisting Test | Retrans-ference Density |
| Example Q-1 | 90 | 92.5 | 91.0 | 90.5 | 0.28 |
| Example Q-2 | 85 | — | — | — | — |
| Example Q-3 | 90 | 93.0 | 92.5 | 92.0 | 0.11 |
| Example Q-4 | 93 | — | — | — | — |
| Example Q-5 | 90 | — | — | — | — |
| Comparative Example Q-1 | 50 | — | — | — | — |

EXAMPLE R-1

As the substrjate or base film use was made of a polyethylene terephthalate film (S-PET, manufactured by Toyobo, Japan) having a thickness of 6 microns, which was subjected to corona discharge treatment on one side. By means of wire bar coating, a transfer layer composition having the following composition was applied on the corona-discharged side of that substrate to a thickness of 1 micron on dry basis to form a transfer layer. On the opposite side two drops of silicone oil (S-41-4003A, manufactured by Shin-etsu Silicone, Japan) by means of a dropper, and were allowed to spread thereover to form a lubricating layer, whereby a heat transfer sheet was obtained.

| | |
|---|---|
| Disperse Dye (Kayaset Blue 136, manufactured by Nippon Kayaku, Japan) | 4 weight parts |
| Ethylhydroxyethyl Cellulose (manufactured by Hercules) | 5 weight parts |
| Toluene | 40 weight parts |
| Methyl Ethyl Ketone | 40 weight parts |
| Dioxane | 10 weight parts |

On the other hand, a receptive layer composition having the following composition was applied on the surface of a substrate formed of 150-micron thick synthetic paper (YUPO-FPG-150, manufactured by Ohji Yuka, Japan) to a thickness of 10 microns on dry basis by means of wire bar coating. After pre-drying with a dryer, 3-minute drying in an oven of 100° C. gave a receptive layer, whereby a heat transferable sheet was prepared.

| Receptive Layer Composition: | |
|---|---|
| Pycotex 100 (α-methylstyrene/Vinyltoluene Copolymer manufactured by Hercules) | 15 wt. parts |
| Toluene | 30 wt. parts |
| Methyl Ethyl Ketone | 30 wt. parts |
| Cyclohexanone | 22 wt. parts |
| KF-393 (manufactured by Shin-etsu Silicone, Japan) | 5 wt. parts |
| X-22-343 (manufactured by Shin-etsu Silicone, Japan) | 5 wt. parts |

The heat transfer sheet and the heat transferable sheet, obtained as mentioned above, was superposed upon each other with the heat transfer layer coming in contact with the receptive layer. Heating was then applied from the substrate side of the heat transfer sheet by means of a thermal head under the conditions of an output of 1w/dot, a pulse width of 4.5 milliseconds and a dot density of 3 dots/mm to transfer the disperse dye of a cyan color contained in the transfer layer of the heat transfei sheet into the receptive layer of the heat transferable sheet, whereby a clear image of a cyan color was obtained. Under the conditions as specified below, light-resisting testing was made of the image transferred onto the heat transferable sheet.

Light-Resisting Testing:

The testing was carried out in accordance with JIS L0842. The results were fifth grade, meaning that extremely improved light resistance was obtained.

COMPARISON EXAMPLE R-1

By means of wire bar coating, a receptive layer composition having the following composition was applied onto a substrate similar to that of Example R-1 to a thickness of 10 microns on dry basis, and was then dried o to form a receptive layer, whereby a heat transferable sheet was prepared.

| Receptive Layer Composition. | |
|---|---|
| Vylon 200 (Polyester Resin manufactured by Toyobo, Japan) | 15 wt. parts |
| Toluene | 30 wt. parts |
| Methyl Ethyl Ketone | 30 wt. parts |
| Cyclohexanone | 22 wt. parts |
| KF-393 | 5 wt. parts |
| X-22-343 | 5 wt. parts |

With the use of a heat transfer sheet similar to that of Example R-1, transference was applied onto the aforesaid heat transferable sheet under similar conditions. Subsequently, light-resisting testing was made of the heat transferable sheet under the conditions similar to those of Example R-1. The results were first grade, indicating that this comrparison example was much inferior in light resistance to Example R-1.

EXAMPLE R-2

The following was used as an ink composition for the formation of an intermediate layer, which was applied onto a substrate to form an intermediate layer of 10 g/m$^2$ on dry basis. Then, Example R-1 was repeated, except that a receptive layer was provided on the surface of the intermediate layer. Where transference was applied under the conditions similar to those of Example R-1, it was found that improvements were as a whole introduced in the density and degree of de-whitening of the image.

| Ink Composition for the Formation of Intermediate Layer: | | |
|---|---|---|
| (A) | Polyurethane Resin (Nippolan 2301, manufactured by Nippon Polyurethane, Japan) | 10 wt. parts |
| | Solvent (DMF/MEK = 1.1) | 90 wt. parts |
| (B) | Polyurethane-Resin (Nippolan 2314) | 10 wt. parts |
| | Solvent (the same as (A)) | 90 wt. parts |
| (C) | Polyurethane Resin (Nippolan 5110) | 10 wt. parts |
| | Solvent (the same as (A)) | 90 wt. parts |
| (D) | Polyester Resin (Vylon 200 manufactured by Toyobo, Japan) | 10 wt. parts |
| | Solvent (Toluene/MEK = 1.1) | 90 wt. parts |
| (E) | Polyester Resin (Vylon 200 manufactured by Toyobo, Japan) | 8 wt. parts |
| | Polyester Resin (Vylon 600) | 2 wt. parts |
| | Solvent (the same as (D)) | 90 wt. parts |
| (F) | Ethylene/Vinyl Acetate Copolymer Resin (Elvaloy U-741 P manufactured by Mitsui Polychemical, Japan) | 20 wt. parts |
| | Solvent (MEK/Toluene = 1.1) | 80 wt. parts |
| (G) | Linear Polyurethane Resin (Desmocol 530 manufactured by Sumitomo Bayer Urethane, Japan) | 10 wt. parts |
| | Solvent (MEK) | 90 wt. parts |
| (H) | Caprolacton Base Polyurethane Resin (Prakuseru EA-1422, manufactured by Daicell Kugaku Kogyo, Japan) | 10 wt. parts |
| | Solvent (MEK) | 90 wt. parts |

-continued

| Ink Composition for the Formation of Intermediate Layer: | | |
|---|---|---|
| (I) | Thermoplastic Polyurethane Resin (Pandex T-5260S-35MT, manufactured by Dai-Nippon Ink Kagaku Kogyo, Japan) | 8 wt. parts |
| | Titanium Oxide | 2 wt. parts |
| | Solvent (MEK) | 90 wt. parts |

EXAMPLE S-1

Heat Transferable Sheet:

By means of a wire bar, a composition for the formation of a receptive layer having the following composition was applied onto a base sheet consisting of synthetic paper having a thickness of ISO microns (YUPO-FPG-150 manufactured by Ohji Yuka, Japan), and was dried for the provision of a receptive layer of 8 g/m$^2$ (on dry basis), whereby a heat transferable sheet was obtained.

| Composition for Receptive Layer | |
|---|---|
| Resin (Vylon 200 manufactured by Toyobo, Japan) | 10 wt. parts |
| Amino-Modified Silicone (KF393 manufactured by Shin-etsu Kagaku Kogyo, Japan) | 0.5 wt. parts |
| Epoxy-Modified Silicone (X-22-343 manufactured by Shin-etsu Kagaku Kogyo, Japan) | 0.5 wt. parts |
| Solvent (Toluene/MEK = 1:1 by weight ratio) | 89 wt. parts |

On the side of the thus obtained heat transferable sheet in opposition to the receptive layer, there was applied a 15% solution of acrylic resin (Dianal BR-35 manufactured by Mitsubishi Rayon, Japan) in toluene/methyl ethyl ketone (having a weight ratio of 1:1) with the use of a wire bar, which was in turn dried to obtain a lubricating layer of 3 g/m$^2$ on dry basis.

A 2.5% solution of an antistatic agent (Stachside manufactured by Analytical Chemical Laboratory of Scoky. U.S.A.) in isopropanol was applied on the surface of that lubricating layer in an amount of 10 g/m$^2$ on wet basis, followed by drying.

On the other hand, as the base sheet, use was made of a polyethylene terephthalate film (manufactured by Toyobo) having a thickness of 6 microns, which was provided on one side with a heat-resistant layer consisting of a thermoset acrylic resin.

On the side of the base sheet in opposition to the heat-resistant layer, there was applied the following composition with the use of a wire bar, which was in turn dried for the provision of a heat transfer layer of 1 g/m on dry basis, whereby a heat transfer sheet was prepared.

| Composition for Heat Transfer Layer: | |
|---|---|
| Disperse Dye (KST-B-186 manufactured by Nippon Kayaku, Japan) | 4 weight parts |
| Ethylhydroxyethyl Cellulose (manufactured by Hercules) | 6 weight parts |
| Solvent (MEK/Toluene = 1:1 (by weight ratio) | 90 weight parts |

Heat Transference:

A stack of 100 heat transferable sheets, obtained as mentioned above, were provided in an atmosphere of a temperature of 20° C. and a relative humidity of 30%. The sheets were removed one by one from that stack for supply to a heat printer portion, and it was found that sheet supply was smooth without jamming. Each of the sheets thus supplied was superposed upon the heat transfer sheet, and printing was carried from the heat-resistant side of the latter. Subsequent separation of both sheets gave a good image to the heat transferable sheet.

COMPARISON EXAMPLE S-1

Example S-1 was repeated, provided however that any lubricating layer was not provided. However, attempts to obtain the heat transferable sheets one by one were unsuccessful, because a pile of two sheets were supplied in most cases, thus resulting in the need of separating one from the other.

EXAMPLE S-2

By means of a wire bar, cast coat paper (manufactured by Kanzaki Seishi, Japan) having a thickness of 130 microns was applied on its cast coat surface with a 10% solution of saturated polyester resin (Vylon 200, manufactured by Toyobo, Japan) in toluene/MEK (a weight ratio of 1:1). And the resulting product was then dried to provide an intermediate layer of 6 g/m$^2$ on dry basis. Thereafter, a composition for the formation of a receptive layer having the following composition was applied on that intermediate layer by means of a wire bar. SubsequentIrying gave a receptive layer of 5 g/m$^2$ on dry basis.

| Composition for the Formation of Receptive Layer. | |
|---|---|
| Polyester Resin (Vylon 200, manufactured by Toyobo, Japan) | 5 weight parts |
| Polyester resin (Vylon 290, manufactured by Toyobo, Japan) | 5 weight parts |
| Amino-Modified Silicone (KF-393 manufactured by Shin-etsu Kagaku Kogyo, Japan) | 0.5 weight parts |
| Epoxy-Modified Silicone (X-22-343 manufactured by Shin-etsu Kagaku Kogyo, Japan) | 0.5 weight parts |
| Solvent (Toluene/MEK having a weight ratio of 1.1) | 89 weight parts |

Subsequently, a 10% solution of a vinyl chloride/vinyl acetate copolymer resin (VYHH, manufactured by Union Carbide, U.S.A.) in toluene/MEK was applied and dried on the side of that paper in opposition to the receptive layer by means of a wire bar to provide a lubricating layer of 3 g/m$^2$ on dry basis.

Furthermore, that lubricating layer was applied on the surface with a 5% solution of a cationic acrylic resin (STH-55, manufactured by Mitsubishi Yuka Fine, Japan) in isopropyl alcohol by means of a wire bar. Subsequent drying gave an antistatic layer of 0.5 g/m$^2$ on dry basis, whereby a heat transferable sheet was obtained.

The thus obtained heat transferable sheet was used together with the heat transfer sheet used in Example S-1 for printing according to Example S-1. The heat transferable sheets could smoothly be supplied one by one.

COMPARISON EXAMPLE S-2

Heat transferable sheets were prepared by repeating Example S-2 with no use of any lubricating layer. Estimation made in accordance with Example S-2 indicated that no smooth supply of the sheets occurred, i.e., the sheets were supplied in the double state.

EXAMPLE T-1

A solution of a thermoplastic polyester resin in MEK/toluene (1/1) was applied on one side of cast coat paper (having a weight of 110 g/m$^2$) in such a manner that the resulting solid content amounted to 10 g/m$^2$. Subsequent drying gave a receptive layer.

Furthermore, the cast coat paper was applied on the side in opposition to the receptive layer (on the back side) with 0.5 g/m$^2$ (on dry basis) of an aqueous solution of an antistatic agent consisting of an ampholytic type polyacrylic ester resin. Thereafter, the resulting sheet was wound with no application of drying. It was found that, as compared with before coating, curling of the sheet was further corrected, and the antistatic coating layer also served to afford a moisture-conditioning effect.

Heat Transfer Sheet:

On the other hand, 10 g/m$^2$ (on dry basis) of a coating material (A) for the formation of a transfer layer having the following composition were applied on one side of a polyethylene terephthalatc film having a thickness of 6 microns. Subsequent drying gave a roll of sheet.

| Coating Material (A) for Transfer Layer | |
|---|---|
| Disperse Dye (KST-P-136) | 4 weight parts |
| Ethylhydroxyethyl cellulose | 6 weight parts |
| MEK/Toluene (1/1) | 90 weight parts |

Transference:

The heat transferable and transfer sheets, obtained as mentioned above, were arranged with the receptive layer being opposed to the transfer layer for image printing with a heat transfer recorder. Neither virtual wrinkling nor dust deposition of the sheet occurred, and the obtained image was of beautiful gradation and suffered limited or reduced variation in quality.

EXAMPLE T-2

Example T-1 was repeated, provided that 5 g/m$^2$ of a coating material having the following composition was applied on the back side of a heat transferable sheet in place of the aqueous solution of an antistatic agent. Recording was carried out in accordance with Example T-1, and similar results were again obtained.

| Coating Material for Back Layer: | |
|---|---|
| Electrically Conductive Zinc Oxide | 10 weight parts |
| Aqueous Solution of Polyvinyl Alcohol Resin | 0.2 weight parts (dry basis) |
| Methyl Methacrylate/Butadiene Latex | 4 weight parts (dry basis) |

EXAMPLE T-3 AND 4

For a heat transfer sheet, 3 g/m$^2$ (on dry basis) of a coating material for a back layer having the following composition was applied and dried on the back side (on which no trinsfer layer was provided) of the heat transfer sheet used in Example T-1, and for a heat transferable sheet, that of Example T-1 was employed (Example T-3). Separately, the product of Example T-2 was employed (Example T4). Recording was otherwise carried out in accordance with Example T-1. As compared with the results of Examples T-1 and T-2, the amounts of wrinkling, dust deposition and variations in image quality were further reduced to a minimum.

| Coating Material For Back Layer. | |
|---|---|
| Electrically Conductive Zinc Oxide | 15 weight parts |
| Polyvinyl butyral Resin | 5 weight parts |
| Toluene/Methyl Ethyl Ketone (1.1) | 50 weight parts |

EXAMPLE U-1

A coating material for a receptive layer having the following composition was applied and dried on a synthetic paper having a thickness of 130 microns in such a manner that the resulting thickness reached 5 microns, thereby providing a receptive layer. Thereafter, printing was carried out on one corner of the back surface thereof with a magnetic ink to store a magnetic code.

| Coating Composition For Receptive Layer: | |
|---|---|
| Polyurethane Elastomer (Pandex T5670, manufactured by Dai-Nippon Ink, Japan) | 3 weight parts |
| Polyvinyl Butyral (S-LEC BX-1, manufactured by Sekisui Kagaku, Japan) | 7 weight parts |
| Amino-Modified Silicone (KF-393, manufactured by Shin-etsu Silicone, Japan) | 0.125 weight parts |
| Epoxy-Modified Silicone (X-22-343, manufactured by Shin-etsu Silicone, Japan) | 0.125 weight parts |

These were dissolved in 140 parts by weight of a mixed solution of tolueneMEK (1:1) for coating and drying.

After the heat transferable sheet had been confirmed to be appropriate by detecting the code thereof with a magnetic head disposed at the inlet of a heat transfer printer, it was supplied into the printer to bring the aforesaid receptive layer in contact with the transfer layer of the transfer film based on a PET film having a thickness of 6 microns (said transfer layer being obtained by coating and drying of a coating material having the following composition and arranged within the printer) for effecting heating from the back surface of the transfer film with a thermal head, whereby a transferred image was obtained.

| Coating Composition for Transfer Layer: | |
|---|---|
| Disperse Dye (Kayaset Blue 136, manufactured by Nippon Kayaku, Japan | 4 weight parts |
| Ethythydroxyethyl Cellulose (manufactured by Hercules) | 5 weight parts |
| Toluene | 40 weight parts |
| Methyl Ethyl Ketone | 40 weight parts |

EXAMPLE U-2

Cast coat paper having a weight of 95 g/m$^2$ was applied and dried on its smoothened surface with a coating material for a receptive layer having the following composition in such a manner that the resulting thickness reached 8 microns, thereby forming a receptive layer. Thereafter, characters were printed on the back surface with a gray gravure ink.

| Coating Material Composition for Receptive Layer. | |
|---|---|
| Polyester Resin (Vylon 200, manufactured by Toyobo, Japan) | 10 weight parts |
| Amino-Modified Silicone (XF-393, manufactured by Shin-etsu, Japan) | 0.3 weight parts |
| Epoxy-Modified Silicone (X-22-343, manufactured by Shin-etsu Silicone, Japan) | 0.3 weight parts |

These were dissolved in 90 parts by weight of a mixed solution of methyl ethyl ketone/toluene/cyclohexanone (4/4/2) to prepare a coating material.

After the heat transferable sheet had been confirmed to be appropriate by a reflection type photosensor disposed at the inlet of a heat-sensitive transfer printer, it was supplied into the printer to bring the aforesaid receptive layer in contact with the dye layer of the transfer sheet based on a PET film having a thickness of 6 microns, said dye layer being obtained by coating and drying of a coating material having the following composition and arranged within a printer for effecting heating from the back surface of the dye film with a thermal head, whereby a transferred image was obtained.

| Composition for Transfer Layer: | |
|---|---|
| Basic Dye (TH1109, manufactured by Hodogaya Kagaku, Japan) | 5 weight parts |
| Polyvinyl Butyral Resin (S-LEC BX-1, manufactured by Sekisui Kagaku, Japan) | 4.5 weight parts |

These were dissolved in 90 parts by weight a mixed solution of toluene/methyl ethyl ketone (1:1) for coating and drying.

EXAMPLE U-3

Cast coat paper having a weight of 110 g/m$^2$ was applied and dried on the flat surface with a mixed solution (having a solid concentration of 10%) of polyurethane elastomer (Pandex T5670, manufactured by Dai-Nippon Ink) in toluene/methyl ethyl ketone in such a manner that the resulting weight amounted to 2 g/m$^2$. On the dried layer, the same receptive layer as in Example U-2 was applied and dried in such a manner that the resulting thickness reached 5 microns. Thereafter, linear printing was carried out on both sides of the back surface thereof with an electrically conductive ink.

After the heat transferable sheet had been confirmed to be appropriate by an electrode provided at the inlet of a heat-sensitive transfer printer and passing current therethrough for printing with an electrically conductive ink, it was supplied into the printer for the formation of a transferred image in a manner similar to that of each Example U-1 or U-2.

EXAMPLE U-4

In accordance with Example U-3, fluorescent dye was pnnted without making any modification to form a heat transferable sheet.

After the heat transferable sheet had been confirmed to be appropriate by a reflection type photosensor positioned at the inlet of a heat-sensitive printer, it was supplied into the printer for the formation of a transferred image in a manner similar to that of each example U-1 or U-3.

What is claimed is:

[1. A heat transfer recording process which performs printing by a dot-shaped heating means on a laminate of (a) a heat transfer sheet having a heat transfer layer of a substance which is softened, melted or gasified by heating formed on a base sheet and (b) a dye-receiving sheet to be used in combination with the heat transfer sheet, having a receptive layer for receiving a dye migrated from the heat transfer sheet upon heating to form an image on the dye-receiving sheet, said process comprising:

reading a physically detectable detection mark formed on the dye-receiving sheet;

laminating the heat transfer sheet with the dye-receiving sheet in accordance with the information thus read; and carrying out printing.]

[2. The heat transfer recording process according to claim 1, wherein said detection mark comprises information which is readable magnetically, optically and/or mechanically.]

[3. The heat transfer recording process according to claim 1, wherein said detection mark comprises information of front and back, direction of the sheet, residual amount of sheet, relative positions between sheets, grade, type, color of the sheet, and recording initiating position.]

*4. A heat transfer recording process which performs printing by a dot-shaped heating means on a laminate of (a) a heat transfer sheet comrprising a base sheet and a heat transfer layer on said base sheet, said layer including a heat transferable dye and a binder of a synthetic resin, and (b) a dye-receiving sheet to be used in combination with the heat transfer sheet, said dye-receiving sheet having on a front surface thereof a dye-receptive layer for receiving a dye migrated from the heat transfer sheet upon heating to form an image on the dye-receiving sheet, said process comprising:*

*preparing said dye-receiving sheet as a sheet having a detection mark including physically detectabIe information and preliminarily provided on a back surface thereof opposite said front surface having said receptive layer;*

*feeding said dye-receiving sheet into a printer;*

*reading said information of the detection mark by means of reading means;*

*conveying said dye-receiving sheet to a print starting position of the printer only when the dye-receiving sheet is determined to be adequate on the basis of the information thus read by said reading means;*

*laminating said heat transfer sheet with said dye-receiving sheet; and*

*carrying out printing by said dot-shaped heating means.*

*5. The heat transfer recording process according to claim 4, wherein said detection mark comprises information for distinguishing the front and back surfaces of the dye-receiving sheet.*

*6. The heat transfer recording process according to claim 4, wherein said detection mark comprises information which is readable magnetically.*

*7. The heat transfer recording process according to claim 4, wherein said detection mark comprises information which is readable optically.*

*8. The heat transfer recording process according to claim 4, wherein said detection mark comprises information which is readable mechanically.*

*9. The heat transfer recording process according to claim 4, wherein said detection mark comprises information of a direction of the dye-receiving sheet.*

*10. The heat transfer recording process according to claim 4, wherein said detection mark comprises information of a residual amount of the dye-receiving sheet.*

*11. The heat transfer recording process according to claim 4, wherein said detection mark comprises information of relative positions between the heat transfer sheet and the dye-receiving sheet.*

*12. The heat transfer recording process according to claim 4, wherein said detection mark comprises information of a grade of the dye-receiving sheet.*

*13. The heat transfer recording process according to claim 4, wherein said detection mark comprises information of a type of the dye-receiving sheet.*

*14. The heat transfer recording process according to claim 4, wherein said detection mark comprises information of a color of the dye-receiving sheet.*

*15. The heat transfer recording process according to claim 4, wherein said detection mark comprises information of a recording initiating position.*

* * * * *